(12) United States Patent
Bellandi

(10) Patent No.: US 12,246,437 B2
(45) Date of Patent: Mar. 11, 2025

(54) INDUSTRIAL MANIPULATOR GRIPPER PROVIDED WITH SENSOR AND METHOD FOR DETECTING THE PRESENCE OF A PIECE BETWEEN THE JAWS OF AN INDUSTRIAL MANIPULATOR GRIPPER

(71) Applicant: GIMATIC S.r.l., Roncadelle (IT)

(72) Inventor: Giuseppe Bellandi, Roncadelle (IT)

(73) Assignee: GIMATIC S.R.L., Roncadelle (IT)

( * ) Notice: Subject to any disclaimer, the term of this patent is extended or adjusted under 35 U.S.C. 154(b) by 760 days.

(21) Appl. No.: 17/601,647

(22) PCT Filed: Feb. 13, 2020

(86) PCT No.: PCT/IB2020/051170
§ 371 (c)(1),
(2) Date: Oct. 5, 2021

(87) PCT Pub. No.: WO2020/225613
PCT Pub. Date: Nov. 12, 2020

(65) Prior Publication Data
US 2022/0161443 A1    May 26, 2022

(30) Foreign Application Priority Data
May 9, 2019    (IT) .................. 102019000006668

(51) Int. Cl.
*B25J 15/02*    (2006.01)
*B25J 13/08*    (2006.01)
*B25J 19/02*    (2006.01)

(52) U.S. Cl.
CPC ......... *B25J 15/0226* (2013.01); *B25J 13/081* (2013.01); *B25J 15/028* (2013.01); *B25J 19/027* (2013.01)

(58) Field of Classification Search
CPC .. B25J 15/0226; B25J 15/028; B25J 15/0273; B25J 13/081; B25J 19/027; B25J 15/08; B25J 15/0206; B25J 13/08
See application file for complete search history.

(56) References Cited

U.S. PATENT DOCUMENTS

| | | | |
|---|---|---|---|
| 6,145,904 A | 11/2000 | Bellandi et al. | |
| 8,919,844 B1 * | 12/2014 | Mascorro | B25J 15/0226 294/203 |

(Continued)

FOREIGN PATENT DOCUMENTS

| | | |
|---|---|---|
| DE | 102015213402 A1 | 1/2017 |
| DE | 202018104903 U1 | 9/2018 |

(Continued)

OTHER PUBLICATIONS

Foreign Communication from Related Application—International Search Report and Written Opinion of the International Searching Authority, International Application No. PCT/IB2020/051170, dated May 27, 2020, 12 pages.

*Primary Examiner* — Stephen A Vu
(74) *Attorney, Agent, or Firm* — CANTOR COLBURN LLP

(57) ABSTRACT

A gripper for industrial manipulators includes a body, jaws constrained to the body and activatable to hold and release a piece, an actuator of the jaws and a sensor configured to detect the presence of a piece between said jaws, is described. Advantageously, the sensor is not positioned between the jaws, in the space intended to accommodate the piece to be held, but is functionally interposed between the actuator and one of the jaws. A method for detecting the presence of a piece between the jaws of an industrial manipulator gripper includes providing a sensor usable to detect the position of a jaw with respect to the actuator of the gripper.

21 Claims, 11 Drawing Sheets

(56) References Cited

U.S. PATENT DOCUMENTS

| | | | |
|---|---|---|---|
| 2003/0222469 A1* | 12/2003 | Moilanen | B25B 5/163 |
| | | | 294/203 |
| 2008/0101895 A1* | 5/2008 | Holcomb | B25J 19/027 |
| | | | 700/258 |
| 2009/0127879 A1 | 5/2009 | Maffeis | |
| 2013/0249229 A1* | 9/2013 | Roberts | B64G 1/646 |
| | | | 294/198 |
| 2017/0182668 A1 | 6/2017 | Ferrier | |
| 2018/0207807 A1* | 7/2018 | Jalenques | B25J 15/0226 |

FOREIGN PATENT DOCUMENTS

| | | |
|---|---|---|
| IT | 102019000006668 | 5/2019 |
| JP | 3825449 B2 | 9/2006 |
| JP | 2009172735 A | 8/2009 |
| WO | 2020225613 A1 | 11/2020 |

* cited by examiner

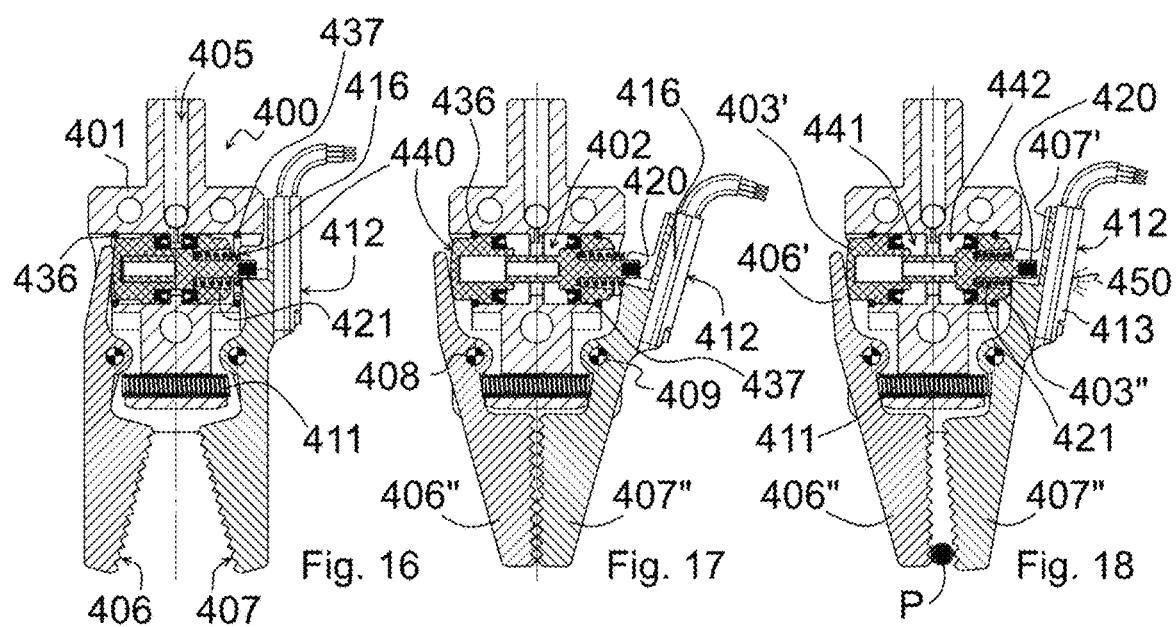
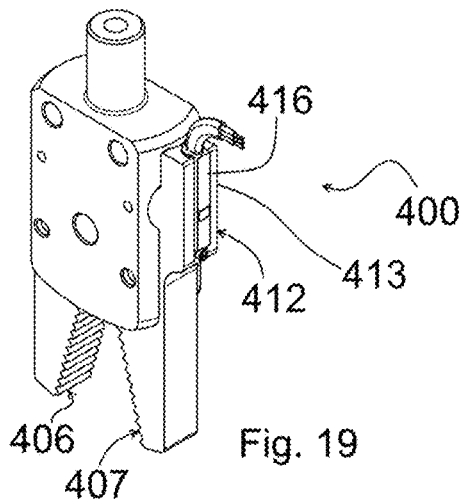
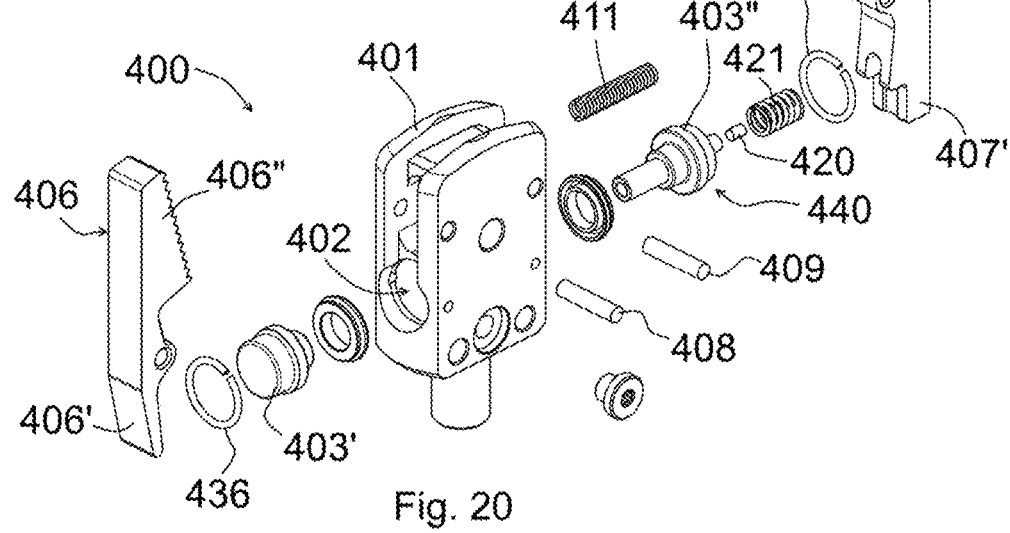

INDUSTRIAL MANIPULATOR GRIPPER PROVIDED WITH SENSOR AND METHOD FOR DETECTING THE PRESENCE OF A PIECE BETWEEN THE JAWS OF AN INDUSTRIAL MANIPULATOR GRIPPER

CROSS REFERENCE TO RELATED APPLICATIONS

This application is a filing under 35 U.S.C. 371 of International Application No. PCT/IB2020/051170, filed Feb. 13, 2020, entitled "Industrial Manipulator Gripper Provided with Sensor and Method for Detecting the Presence of a Piece Between the Jaws of an Industrial Manipulator Gripper," which claims priority to Italian Patent Application No. 102019000006668, filed May 9, 2019, which applications are incorporated by reference herein in their entirety.

FIELD OF THE INVENTION

The present invention refers to a gripper for industrial manipulators.

STATE OF THE ART

In the field of industrial automation, it is known the use of robotic manipulators usually having a gripper combined therewith to grip the objects to be manipulated.

Grippers for industrial manipulators are generally provided with two or more jaws, or gripper fingers, mounted on a gripper body. The jaws can be moved away from, or closer to each other, between an open position, or releasing position, in which they do not apply any pressure on the piece to be manipulated, and a closed position, or gripping position, in which they apply to the piece to be manipulated sufficient pressure to ensure that the piece is not accidentally released during its handling.

Depending on the type of jaw movement, a distinction is made between linear grippers, in which the jaws move linearly in or on their respective guides, and angular grippers, in which the jaws pivot around respective pivot axes.

The jaws are moved by means of an actuator device housed inside the gripper body, usually of pneumatic, hydraulic, or electric type.

The grippers are sometimes equipped with a sensor, usually of magnetic type, whose function is to generate an electrical signal indicating the presence of the piece between the jaws. By using the sensor, the cases in which the gripper has not picked up the piece to be handled, or the piece has accidentally fallen, can be distinguished. Two configurations are currently known.

In a first configuration, used on pneumatic grippers, a magnetic element is fitted on board the air piston that moves inside the gripper body, and a special sensor detects the position of the magnetic element thereby indirectly detecting the position of the air piston. When the piece is correctly inserted between the gripper jaws, the air piston does not reach the end of its stroke, precisely because the jaws cannot move closer beyond the volume defined by the piece clamped between them. When the piece is accidentally released from the jaws, or is not picked up, the jaws can close completely against each other and the air piston reaches the respective limit stop; in this circumstance an alarm is generated by the signal produced by the magnetic sensor.

One limitation of this solution is the need to use low-hysteresis magnetic sensors, or analog sensors, which are more expensive than standard sensors, otherwise the accuracy of the reading by the sensor would not be sufficient to distinguish small movements of the air piston. In fact, the standard, inexpensive, commonly used magnetic sensors are digital sensors, which generate a signal only if the flux intensity of the detected magnetic field exceeds a threshold value, for example 25 Gauss, and switch off when the flux intensity of the magnetic field decreases below a lower threshold value, for example 20 Gauss. This hysteresis causes standard magnetic sensors to be not very accurate (they require a long stroke of the magnetic element of the sensor). This is the reason why low-hysteresis magnetic sensors, which are more expensive, are adopted.

In a second configuration, mainly used in spruce grippers, the magnetic sensor is positioned on one of the jaws, i.e. right on board one of the jaws, so that the piece to be handled remains clamped between the magnetic sensor and the opposite jaw. The magnetic sensor is in this case manufactured with a portion stationary with respect to the respective jaw and a portion movable with respect to the stationary portion. When a piece is picked up by the gripper, the movable portion of the magnetic sensor is thrust towards the stationary portion, and the sensor generates a corresponding electrical signal; when the jaws open up and the piece is released, the movable part of the magnetic sensor moves away from the stationary part, under the thrust of an elastic element.

The drawback of this solution is to have the magnetic sensor on board a jaw so that the magnetic sensor limits the space available around the jaws, and in particular limits the opening angle of the gripper. In addition, since the magnetic sensor is on a jaw and faces the opposite jaw, the gripper is not symmetrical and this can involve difficulties in programming the robotic arm where the gripper is fitted, since the size of the magnetic sensor must be taken into account when picking up and releasing pieces.

JP 2009 172735 describes a gripper dedicated to the handling of pieces, which is provided with a sensor that detects the deformation of a spring to distinguish if there is a piece between the jaws or not; the spring is compressed when the jaws exert pressure on a piece.

US 2017/182668 describes a pneumatic gripper for holding plates or sheets. The actuator is an air piston that moves the jaws by means of a cam-type transmission mechanism. An electronic sensor is positioned at the transmission mechanism to detect the position of the jaws and distinguish the state in which the plate has been gripped or the plate is not between the jaws.

US 2018/207807 describes an electric gripper specifically designed to handle Petri dishes, i.e. pieces of predetermined diameter, all equal to each other. The gripper comprises a compensation mechanism that prevents excessive force from being applied to the Petri dishes. An optical sensor is prearranged at the compensation mechanism and at a jaw, in order to detect the presence of a Petri dish between the jaws.

JP 3 825449 describes a gripper in which the sensor is positioned on the jaws (paragraph 28, FIG. 3, optical sensor 43 and 44).

U.S. Pat. No. 6,145,904 and US 2009/127879 describe gripper known in the art, pneumatically operated and with parallel jaws.

SUMMARY OF THE INVENTION

Object of this invention is to provide a gripper for industrial manipulators, provided with a sensor to detect the presence of the piece between the jaws, which not only overcomes the drawbacks of traditional solutions but is also simple to manufacture.

Therefore, a first aspect of the present invention relates to a gripper according to claim 1.

In more detail, the gripper comprises a body, jaws constrained to the body and activable to hold and release a piece, an actuator of the jaws and a sensor configured to detect the presence of a piece between said jaws. Advantageously, the sensor is not positioned between the jaws, in the space intended to accommodate the piece to be held, but is functionally interposed between the actuator and one of the jaws.

In other words, in the gripper according to the present invention the sensor is not positioned downstream of the jaws, but upstream of them, and in particular between a jaw and the actuator.

The expression functionally interposed has the following meaning: regardless of the position physically taken with respect to the other components of the gripper, the sensor performs its function between a jaw and the actuator, i.e. it interacts between a jaw and the actuator and not between the two jaws or between the jaw and the piece to be picked up.

This configuration provides the following advantages.

First of all, no space between the jaws is occupied by the sensor: the recovered (unoccupied) space can be used to pick up and hold pieces. In addition, for a certain piece to be held, the jaws can be opened and closed more quickly.

Another advantage is that the gripper can be made so that the picked-up pieces are held substantially on a lying plane at equal distances from the jaws, i.e. on the center line of the gripper, thus facilitating the work of the industrial manipulator.

Another advantage is that the picked-up pieces, which can also be hot or dirty, are not touched by the sensor so that, in the long run, this results in a longer service life for the sensor.

The proposed solution can be easily implemented both on angular rippers and grippers with parallel jaw at low cost.

Preferably the jaws comprise distal ends intended to hold a piece and opposite proximal ends, or shoulders, movable with respect to each other by the actuator. The actuator acts on the proximal end of at least one jaw (a jaw may be stationary, for example, or all jaws are movable). The sensor is functionally interposed between the actuator and the proximal end of one of these jaws, for example it is configured to generate a signal indicating the position of the proximal end of a jaw with respect to the actuator, the signal also indicating if there is a piece between the jaws or not.

Preferably the sensor is of magnetic type and in turn comprises magnetic element and an electronic circuit for detecting the magnetic element, e.g. based on the Hall effect. The electronic circuit is fixed with a jaw and the magnetic element is movable with respect to the electronic circuit in response to the stresses exerted by the actuator.

In an embodiment, the electronic circuit is fitted to a jaw at the proximal end thereof and the magnetic element is fitted to the actuator, e.g. to an air piston or rod of a linear actuator, and is movable therewith with respect to the electronic circuit between a first position, at which the magnetic element is at the maximum distance from the electronic circuit, and a second position, at which the magnetic element is at the minimum distance from the electronic circuit, in response to the stresses exerted by the jaw having the sensor fitted thereto and in particular in response to the stresses exerted by that jaw when the actuator is activated.

In an alternative embodiment, the electronic circuit is fitted to a jaw at its proximal end, and the magnetic element is fitted to a dedicated element interposed between the electronic circuit and the actuator and movable between a first position, at which the magnetic element is at the maximum distance from the electronic circuit, and a second position, at which the magnetic element is at the minimum distance from the electronic circuit, in response to the stresses exerted by the jaw having the sensor fitted thereto.

Preferably the minimum-distance position of the magnetic element from the electronic circuit corresponds to the piece gripping position of the jaws, i.e. corresponds to the state in which a piece is held between the jaws. Therefore, when the electronic circuit detects that the magnetic element is in the second position, i.e. at the minimum distance, it generates a signal confirming that the piece is correctly held by the gripper; when the electronic circuit detects that the magnetic element is moving away, a signal corresponding to another condition is generated, for example corresponding to the open or closed position of the jaws, but without gripped piece, or no signal is generated.

Preferably the magnetic element is arranged to be movable with respect to the respective jaw, so that:
  during the closing movement of the jaws, the magnetic element does not rotate with respect to the respective jaw and the distance between the magnetic element and the electronic circuit does not change but remains constant, up to the point where the jaws move both in abutment against the piece to be picked up. In this circumstance the sensor does not generate the signal that the piece has been gripped;
  subsequently, as the jaws close on the piece to be picked up and the actuator exerts the thrust required to lock the piece between the jaws, the magnetic element and the respective jaw rotate with respect to each other, and the distance between the magnetic element and the electronic circuit decreases, in some cases up to zero, i.e. up to the point where the magnetic element comes in abutment against the electronic circuit. In this circumstance the sensor generates the signal that the piece has been gripped.

This way, economic sensors, not necessarily of the low hysteresis type, can be used without risking that false positive signals are generated during the operation of the gripper, i.e. signals that the piece has been gripped while the piece actually is not between the jaws.

For example, the sensor comprises a first portion that defines a housing for an electronic circuit, e.g. a housing in which the electronic circuit can be positioned so that the position can be adjusted, and a second portion in which a magnetic element is housed. In addition, the sensor comprises an elastic element interposed between the first portion and the second portion; the second portion is movable with respect to the first portion, in response to the stresses exerted by the jaw having the sensor fitted thereto, and the elastic element exerts a countering force on the actuator.

More preferably, the first portion of the sensor is fixed with a jaw or is made in one piece therewith, and the second portion is hinged to the first portion and can be rotated with respect to the latter, or it swings, as a result of the stresses exerted by the same jaw when the actuator is activated, and as a result of the countering force exerted by the elastic element.

For example, the first portion of the sensor is fixed to a jaw at a respective proximal end and the same jaw forces the second portion to rotate with respect to the first portion. When a piece is held between the jaws, the angle between the first portion and the second portion is minimum, and the elastic element is compressed.

Preferably the second portion of the sensor is a sliding block in abutment against a portion of the actuator. The actuator is movable and acts on the sliding block, exerting a thrust thereon.

In general, the actuator can be pneumatic, hydraulic or electric.

Preferably, in general, the position of the magnetic element with respect to the respective electronic detecting circuit depends both on the position of the jaw having the sensor fitted thereto, which in turn depends on the size of a piece that may be held between the jaws, and on the position of the actuator.

The Applicant reserves to file a divisional patent application for an alternative embodiment of the present invention in which the sensor is of pneumatic type. In this case the sensor comprises:
 a duct which opens between a gripper jaw and the actuator and provides fluid communication with an outer depression or vacuum source, which can also be in a remote position and connected to the sensor by rubber hoses, where an instrument to detect the pressure value (i.e. the depression value) in the sensor can be prearranged; and
 a shutter movable between an open position and a closed position of the duct, in response to the stresses exerted by the same jaw having the sensor fitted thereto.

Preferably the pneumatic sensor comprises a first portion that can be constrained to a jaw, at a proximal portion, or shoulder, thereof. The duct is defined in the first portion. The sensor further comprises a second portion constrained to the first portion and movable with respect to the latter between the open position and the closed position, in response to the stresses exerted by the same jaw having the first portion of the sensor fitted thereto.

For example, the second portion of the sensor is hinged to the first portion and is rotatable with respect to the latter between the open position and the closed position, depending on the angular position of the jaw having the first portion fitted thereto.

The operation of this embodiment is simple: when the jaws close without picking up a piece P, the sensor duct is not closed by the shutter, and a first depression value is detected in the duct itself; on the other hand, when a piece is held between the jaws, the shutter closes the sensor duct, and a second depression value greater than the first one is detected in the duct itself. Thanks to the detection of the pressure (depression) difference in the duct, the condition in which the piece has been gripped and in which the piece is missing can be distinguished.

In the preferred embodiment, the actuator comprises at least one air piston alternately movable along a longitudinal direction in a corresponding cylinder defined in the gripper body, under the action of a pressurized fluid supplied into the cylinder and of an elastic return element.

The gripper according to the present invention may be an angular gripper, and in this case the jaws are pivotable on pins and each comprise a distal end intended to hold a piece, and a proximal end, or shoulder, on which the actuator exerts its own thrust. The distal ends are opposite the proximal ends with respect to the pins, and the jaws swing between an open position, at which the distal ends are spread out and the proximal ends are close together, and a closed position, at which the distal ends are close together, or in abutment, and the proximal ends are spread out, and the position of the jaws when gripping the piece is intermediate with respect to the open position and the closed position.

The gripper according to the present invention can be a gripper with parallel jaws, and in this circumstance at least one jaw can be translated along a guide and comprises a corresponding arm swinging on a pin which causes the jaw to be displaced on the guide. The proximal end of the jaw is defined by the respective swinging arm and the sensor is functionally interposed between the actuator and said swinging arm.

In general, the gripper can have a stationary jaw and a single movable jaw, two movable jaws, three movable jaws, etc.

The actuator preferably includes at least one air piston that can be inserted or moved between the proximal ends of the jaws to spread them out. Alternatively, the actuator is hydraulic or electric.

Another object of the present invention is to provide a method for detecting the presence of a piece between the jaws of a gripper for industrial manipulators that overcomes the drawbacks of traditional solutions.

Therefore, a second aspect of the present invention relates to the method according to claim 20.

In more detail, the method comprises:
 providing a gripper equipped with a body, jaws constrained to the body and activable to hold and release a piece, an actuator of the jaws and a sensor,
 by means of the actuator, moving the jaws between an open position, a closed position and a gripping position of the piece, to pick up and hold a piece,
 by means of the sensor, generating a signal indicating that the piece has been properly gripped.

Advantageously, in order to achieve the advantages described above in relation to the gripper, i.e. to distinguish that a piece has been gripped, the sensor detects the position of (at least) one jaw with respect to the actuator.

In practice, the sensor is functionally interposed between the actuator and one of said jaws and generates a signal when the position of said one jaw with respect to the actuator corresponds to a piece correctly gripped.

The sensor detects the deviation of said one jaw from the closed position of the jaws when the actuator is active, i.e. when the actuator is in the position corresponding to the closed jaws; the deviation is caused by the piece between the jaws.

BRIEF LIST OF THE FIGURES

Further characteristics and advantages of the invention will be more evident from the review of the following specification of preferred, but not exclusive, embodiments of the invention, depicted for illustration purposes only and without limitation, with the aid of the attached drawings, wherein:

FIG. 16 is a vertical section view of a fourth embodiment of a gripper for industrial manipulators according to the present invention, whose jaws are completely open;

FIG. 17 is a vertical section view of the gripper shown in FIG. 16, whose jaws are completely closed;

FIG. 18 is a vertical section view of the gripper shown in FIG. 16, whose jaws are closed against a piece to be handled;

FIG. 19 is a perspective view of the gripper shown in FIG. 16, whose jaws are open;

FIG. 20 is an exploded view of the gripper shown in FIG. 16;

DETAILED DESCRIPTION OF THE INVENTION

FIGS. 1-5 show a first embodiment 100 of the gripper for industrial manipulators according to the present invention.

Figure 1:
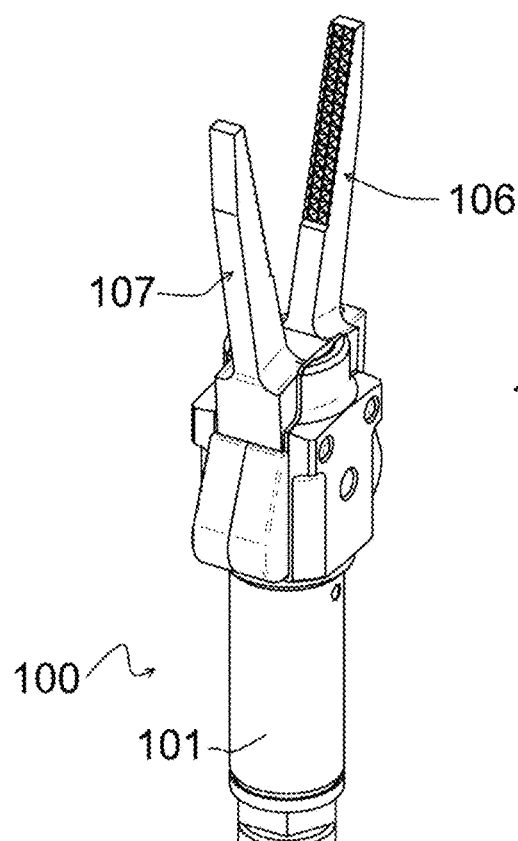
FIG. 1 is a perspective view of a first embodiment of a gripper for industrial manipulators according to the present invention.
Figure 2:
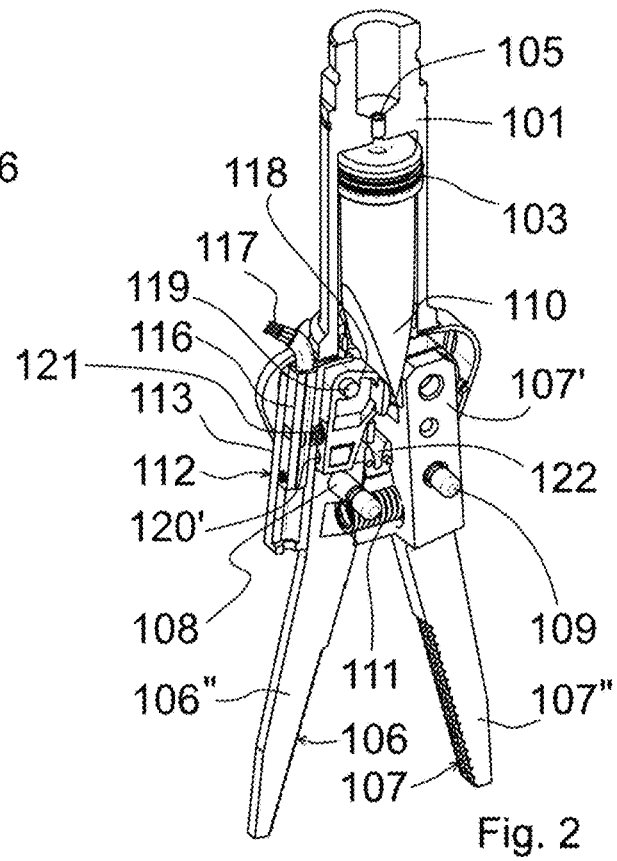
FIG. 2 is a partially sectional perspective view of the gripper shown in FIG. 1, whose jaws are open.
Figure 3:
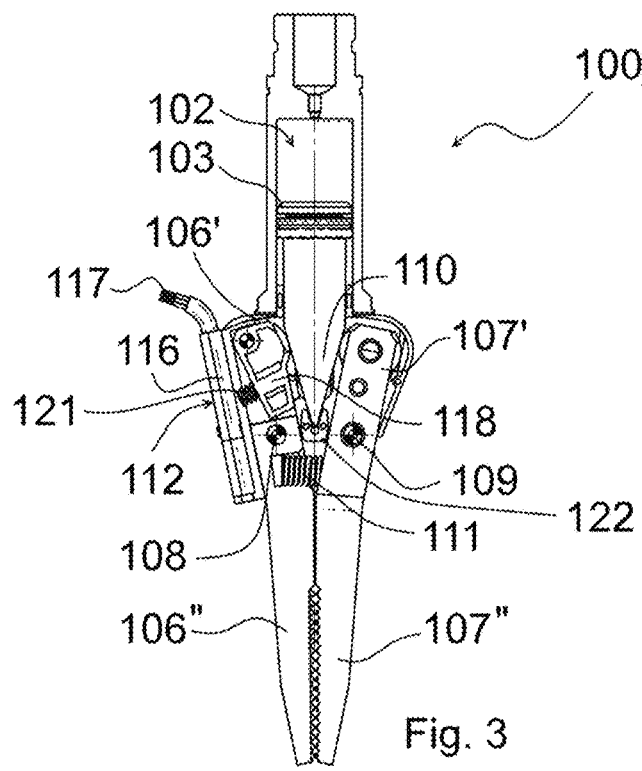
FIG. 3 is a partially sectional and elevation view of the gripper shown in FIG. 1, whose jaws are completely closed.

The gripper 100 comprises a body 101 inside which a cylinder 102 having an air piston 103 movable therein is defined, according to a typical cylinder-piston coupling. Compressed air is supplied through the nozzle 105. The gripper comprises two jaws 106 and 107 fitted to the body by means of pins 108 and 109, so as to be able to pivot between an open position, at which the jaws 106, 107 are spread out as shown in FIGS. 1, 2 and 5, and a closed position, at which the jaws 106, 107 are in abutment against each other as shown in FIG. 3. FIG. 4 shows an intermediate position between the open position and the closed position, which can be defined piece gripping position, with the jaws 106, 107 slightly spread out and closed against a piece P to be handled.

The closing movement of the jaws 106, 107 is caused by the piston 103 that has a wedge-shaped portion 110 which gets in between the jaws 106, 107 when the compressed air is supplied through the nozzle 105 and the piston 103 moves towards the end of the cylinder 102 closest to the jaws 106, 107 themselves, i.e. it moves towards the point that can be called closure dead point. Precisely to achieve the closure, the jaws 106, 107 are equipped with shoulders 106' and 107' (which can also be defined proximal ends) extending from the respective pins 108, 109 towards the wedge-shaped portion 110 of the piston 103, on the opposite side with respect to the distal ends 106" and 107" which have the function of picking up and holding the pieces P.

A resilient element 111, such as a spring or rubber element, is inserted between the jaws 106, 107 to cause the gripper to automatically open when the piston 103 returns to its initial position, i.e. when the compressed air supply is suspended. The spring 111 exerts a thrust that tends to spread out the distal ends 106" and 107" of the jaws 106, 107, i.e. it tends to return the jaws 106, 107 to the open position when the thrust exerted by the wedge-shaped portion 110 of the piston 103 stops.

In the example shown in figures, the spring 111 acts along a direction orthogonal to the longitudinal direction along which the piston 103 is displaced.

The gripper 100 comprises a sensor denoted as a whole by the numeral 112, whose function is to generate an electrical signal indicating the position taken at any given moment by the jaws 106, 107. Unlike the solutions known in the art, in the gripper 100 the sensor 112 is not positioned on board the piston 103 or on the distal end 106', 107' of one of the jaws 106, 107; the sensor 112 is functionally interposed between the piston 103 and one of the jaws 106, 107, in particular between the wedge-shaped portion 110 of the piston 103 and the shoulder 106', 107' of one of the jaws 106, 107.

In the example shown in FIGS. 1-5, the sensor 112 is interposed between the wedge-shaped portion 110 of the piston 103 and the shoulder 106' of the jaw 106.

The sensor 112 is of magnetic type and now its structure and operation will be described in detail.

Turning to FIG. 5, the sensor 112 comprises a first portion 113 intended to be fixed to the shoulder 106' of the jaw 106 in order to be stationary with respect to the latter; in other words, the first portion 113 of the sensor 112 is intended to rotate fixedly with the shoulder 106' with respect to the pin 108. In the example shown, the first portion 113 of the sensor 112 has protrusions 114 that snap into corresponding holes 115 obtained on the shoulder 106' of the jaw 106.

On the portion 113 of the sensor 112 there is an electronic circuit 116 able to detect, by Hall effect, the presence of a magnetic element at a given distance. In order to power the electronic circuit 116 and to collect the electrical signal generated by the sensor 112, wiring 117 is provided.

The sensor 112 also comprises a second portion 118, which can be defined sliding block, pivotally constrained to the first portion 113, thanks to a pin 119 inserted through the shoulder 106' of the jaw 106 and through both the first portion 113 and the second portion 118 of the sensor 112. In other words, the second portion 118 of the sensor 112 is hinged to the first portion 113 by means of the pin 119.

Thanks to this configuration, the second portion 118 is movable with respect to the first portion 113, and therefore also with respect to the shoulder 106' of the jaw 106, between a distal position, corresponding to the maximum possible angle between the two parts, and a proximal position, corresponding to the minimum possible angle between the two parts 113 and 118.

As best shown in FIG. 5, a magnetic element 120, shaped like a pellet, is housed in a dedicated seat 120' in the second portion 118. Since the magnetic element 120 moves fixedly with the second portion 118, the detection of the position of the magnetic element 120 by the electronic circuit 116 fitted on board the first portion 113 of the sensor 112 corresponds to indirectly measure the angular position of the second portion 118, which in turn depends univocally on the position taken by the jaw 106 at the time of detection. The second portion 118 is always in abutment against the wedge-shaped portion 110 of the piston 103, acting as a sliding block on the respective surface, and for this reason the second portion 118 of the sensor 112 preferably has a rounded surface to facilitate the sliding of the piston 103 on the wedge-shaped portion 110.

An elastic element 121, preferably a spring, is functionally interposed between the two portions 113 and 118 of the sensor 112, so as to constantly exert a thrust that tends to move the second portion 118 away from the first portion 113. It is right the piston 103 that, when moving towards the respective closure dead point, counters the spring 121 by slotting in between the shoulders 106' and 107' of the jaws 106 and 107 and thus limiting the relative movement of the second portion 118 with respect to the first portion 113 of the sensor 112.

In other words, when the gripper 100 is activated and the piston 103 is thrust by the compressed air, the piston 103 itself exerts a thrust on the second portion 118 of the sensor 112, thereby counteracting the force exerted by the spring 121. If a piece P is gripped, the new angular position taken by the jaw 106 causes the second portion 118 to pivot on the pin 119 and the angle between the parts 113 and 118 to correspondingly decrease; in this circumstance the electronic circuit 116 detects the approach of the magnetic element 120. When a given relative position of the magnetic element 120 is reached, i.e. when the electronic circuit 116 detects that the flux intensity of the magnetic field generated by the magnetic element 120 reaches a threshold value, corresponding in practice to an univocal angular position of the portion 118 of the sensor 112 and, therefore, corresponding to the situation of the piece having been gripped, the sensor 112 generates a corresponding signal.

If the gripper 100 accidentally loses the piece P, or the latter is not gripped at all, the piston 103 stops against a limit stop 122 (closure dead point), without causing the elastic element 121 to be compressed, and therefore without generating the signal corresponding to the piece P having been successfully gripped. For example, in FIG. 4 the portion 110 of the piston 103 is not in abutment against the limit stop 122, as is conversely shown in FIG. 3.

In particular, FIG. 2 shows the gripper 100 with the jaws 106, 107 completely open: the angle between the second portion 118 and the first portion 113 of the sensor 112 is maximum and the magnetic element 120 is at the maximum distance from the electronic circuit 116. FIG. 3 shows the gripper 100 with the jaws 106, 107 completely closed: the angle between the second portion 118 and the first portion 113 of the sensor 112 is maximum and the magnetic element 120 is at the maximum distance from the electronic circuit 116. FIG. 4 shows the gripper 100 with the jaws 106, 107 in the intermediate gripping position of the piece P: the angle between the second portion 118 and the first portion 113 of the sensor 112 is minimum, and the magnetic element 120 is in the position closest to the electronic circuit 116 precisely because of the angular displacement of the jaw 106 from the closed position.

By adopting the solution just described, the industrial manipulator is able to determine without errors that the piece P has possibly fallen or that it has not been gripped. In both cases, the consent of the sensor 112 fails and the manipulator stops, i.e. the gripper 100 is stopped.

The solution described provides several advantages.

First of all the space around the jaws 106, 107 remains completely free: the sensor 112 is not fitted to a distal end 106" or 107" of the jaws 106, 107, i.e. it is not fitted to the part of the jaws 106, 107 that must interact with the piece P to be handled. This way, the gripper 100 can be better utilized.

Secondarily, the gripper 100 is symmetrical due to the absence of the sensor 112 between the distal ends 106" or 107" of the jaws 106, 107, since the jaws 106 and 107 are symmetrical and move in mirror-like manner with respect to the longitudinal axis of the gripper 100 along which the piece is maintained during handling.

Another advantage is that the sensor 112 can be made with cheap components: in fact, the sensor 112 is not required to be of the low hysteresis or analog type because the operation of the sensor 112 is also based on the presence of the elastic element 121. In more detail, the spring modulus 121 is selected so that the spring 121 can be pressed only if the gripper 100 grips the piece P; if the gripper 100 does not pick up the piece, due to an error, the spring 121 is not compressed.

The closing movement of the jaws 106, 107 on a piece will be described with reference to FIGS. 2, 2A, 3 and 4A-4C, considering the case in which the gripper 100 has to pick up three pieces with circular section, but with different diameter, P', P" and P"', respectively.

For example, at first, when the command of picking up the piece P reaches the gripper 100, the jaws 106, 107 thereof may be open, as shown in FIG. 2, or the jaws 106, 107 may be closed, as shown in FIG. 3.

It should be noted that during the closing movement of the jaws 106, 107, from the position shown in FIG. 2, as long as the jaws do not close on the piece P, the angle between the second portion 118 and the first portion 113 of the sensor 112 is maximum, and the magnetic element 120 is in the position furthest from the electronic circuit 116.

In other words, during the closing movement of the jaws 106, 107, as long as the jaws do not both comes in abutment onto the piece P to be handled, the second portion 118 of the sensor 112, i.e. the sliding block, moves fixedly with the jaw 106, i.e. these elements do not pivot with respect to each other on the pin 119.

This behavior is due to the fact that the second portion 118 of the sensor 112 cannot be rotated on the pin 119 with respect to jaw 106 by the wedge-shaped portion 110 of the piston 103 as long as the preload of elastic element 121 is not exceeded; this exceeding condition only occurs when the jaws 106, 107 move to grip a piece P and the wedge-shaped portion 110 of the piston 103 moves further in the direction corresponding to spreading out the portions 106' and 107' of the jaws 106 and 107.

This way, i.e. by preventing the relative rotations of the second portion 118 of the sensor 112 with respect to the jaw 106 before the jaws 106 and 107 clamp the piece P, the magnetic element 120 is kept away from the sensor 112.

This circumstance is favorable, because although cheap sensors 112 are adopted, not necessarily of low-hysteresis type, false positive signals are avoided.

Figure 2A:
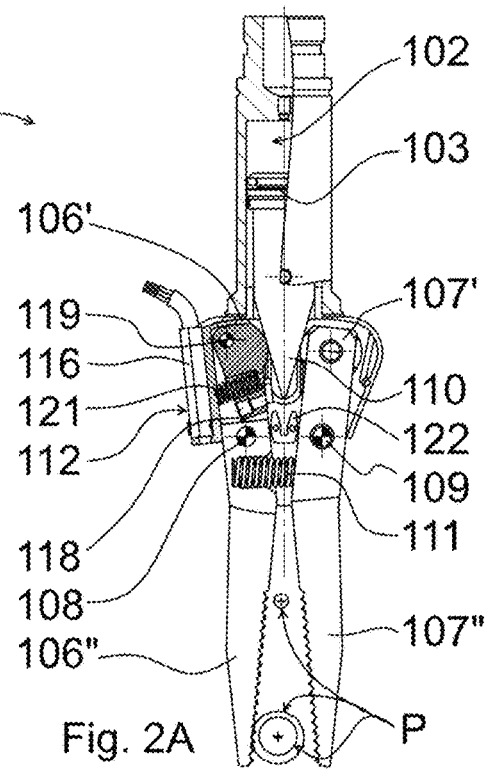
FIG. 2A is a partially sectional perspective view of the gripper shown in FIG. 1, where jaws are closing.

FIG. 2A shows the gripper 100 at a time when the jaws 106, 107 are moving to be closed on a piece P (pieces P of three different diameters are schematically shown): during the closing movement the angle between the second portion 118 and the first portion 113 of the sensor 112 remains constant, and preferably equal to the maximum value, up to the point where the jaws close on the piece P and, after that, said angle decreases as long as the second portion 118 of the sensor 112 rotates and reaches the limit stop corresponding to the magnet 120 in abutment right against the sensor 112 and corresponding to a null angle.

Figure 4A:
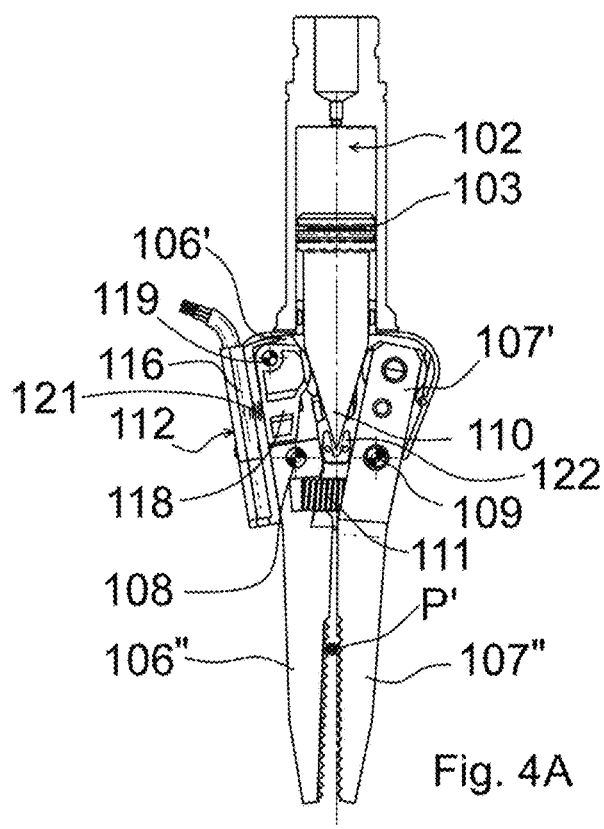
FIG. 4A is a partially sectional and elevation view of the gripper shown in FIG. 1, whose jaws are closed against a first piece to be handled.
Figure 4B:
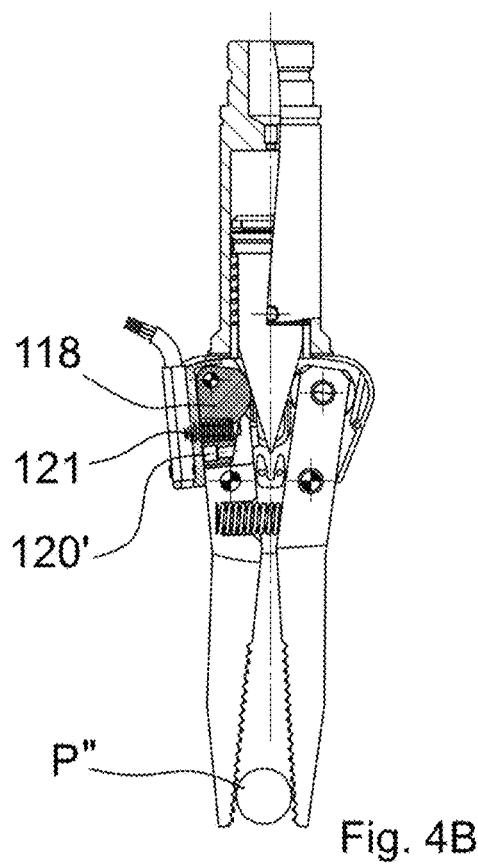
FIG. 4B is a partially sectional and elevation view of the gripper shown in FIG. 1, whose jaws are closed against a second piece to be handled.
Figure 4C:
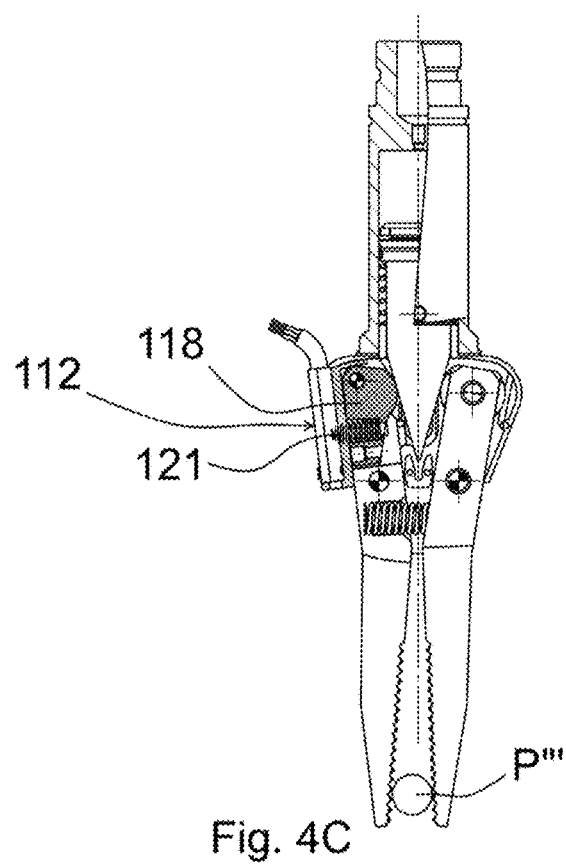
FIG. 4C is a partially sectional and elevation view of the gripper shown in FIG. 1, whose jaws are closed against a third piece to be handled.
Figure 5:
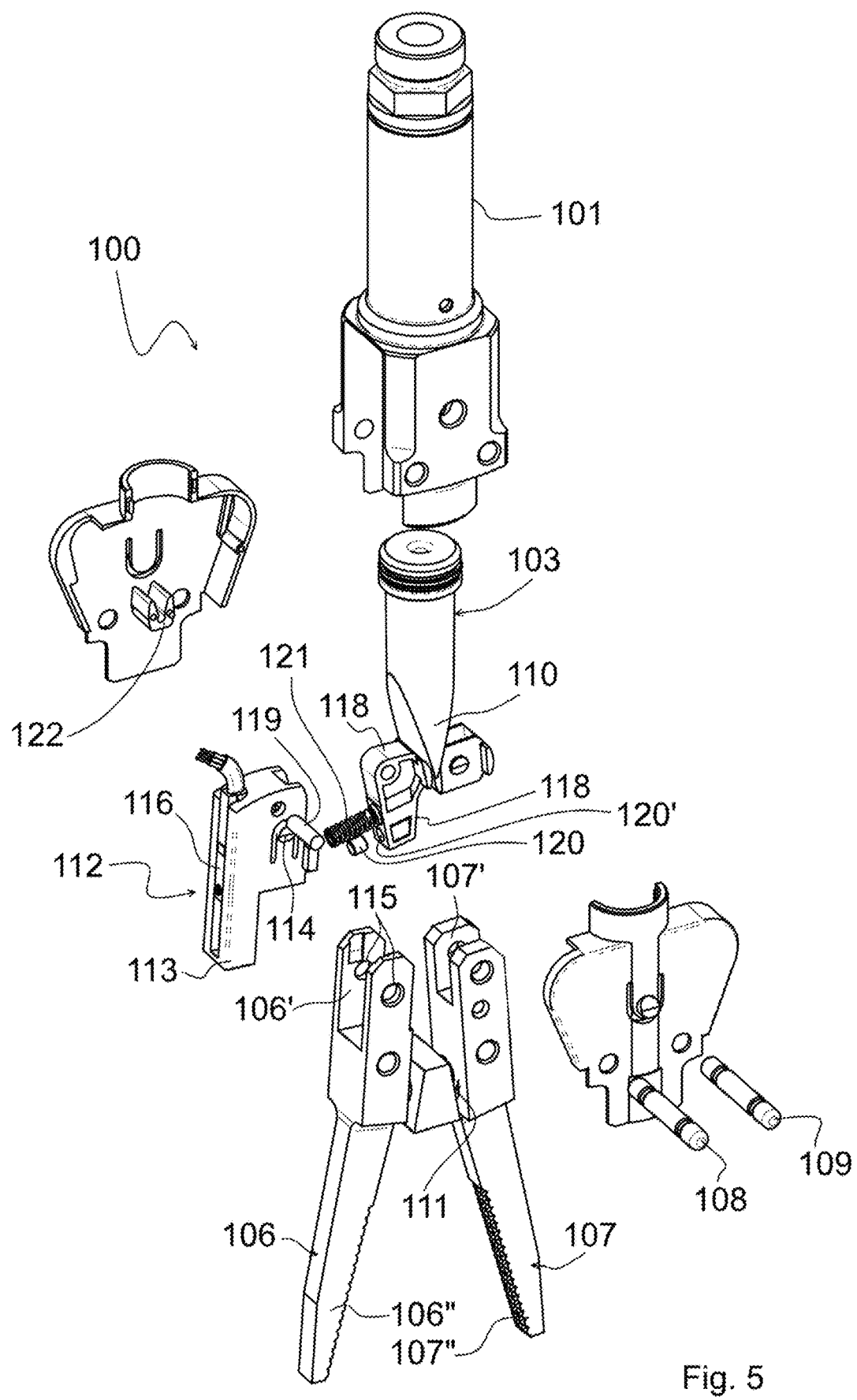
FIG. 5 is a perspective and exploded view of the gripper shown in FIG. 1, whose jaws are open.

FIGS. 4A-4C show the gripper 100 with the jaws 106, 107 (especially the portions 106" and 107") closed on a small-diameter piece P', an intermediate-diameter piece P" and a large-diameter piece P''', respectively.

As can be seen, in all three cases between the second portion 118 and the first portion 113 of the sensor 112 there is a null angle: the magnet 120 is in abutment against the sensor and the signal that the piece has been gripped, i.e. the signal indicating that the piece P', P", P''' is closed between the jaws 106, 107, is generated.

Thanks to the fact that, at first, the jaw 106 and the second portion 118 of the sensor 112 move fixedly and then they rotate with respect to each other, a signal always correct without false positives regardless of the diameter of the piece P', P", P''' can be obtained by the sensor 112.

FIGS. 6-9 show a second embodiment 200 of the gripper according to the present invention, equivalent to the first embodiment 100. Also in this structural variation, two jaws 206 and 207 swing on respective pins 208, 209 with respect to the body 201, in response to the stresses exerted by an air piston 203 functioning as an actuator and moving, alternately in the longitudinal direction, inside a cylinder 202 obtained in the body 201.

An elastic element 211, basically a preloaded spring, is interposed between the two jaws 206, 207, on the opposite side of the piston 203 with respect to the pins 208, 209, to bring the jaws 206, 207 to the open position when the piston 203 moves back in the cylinder 202. In other words, the spring 211 exerts a thrust on the distal ends 206" and 207" of the jaws 206, 207 to spread them out, and the piston 203 exerts a thrust on the shoulders 206' and 207' of the jaws 206, 207', by means of a wedge-shaped portion 210 that slips right between the shoulders 206' and 207' to spread them out, countering the force exerted by the spring 211.

Figure 9:
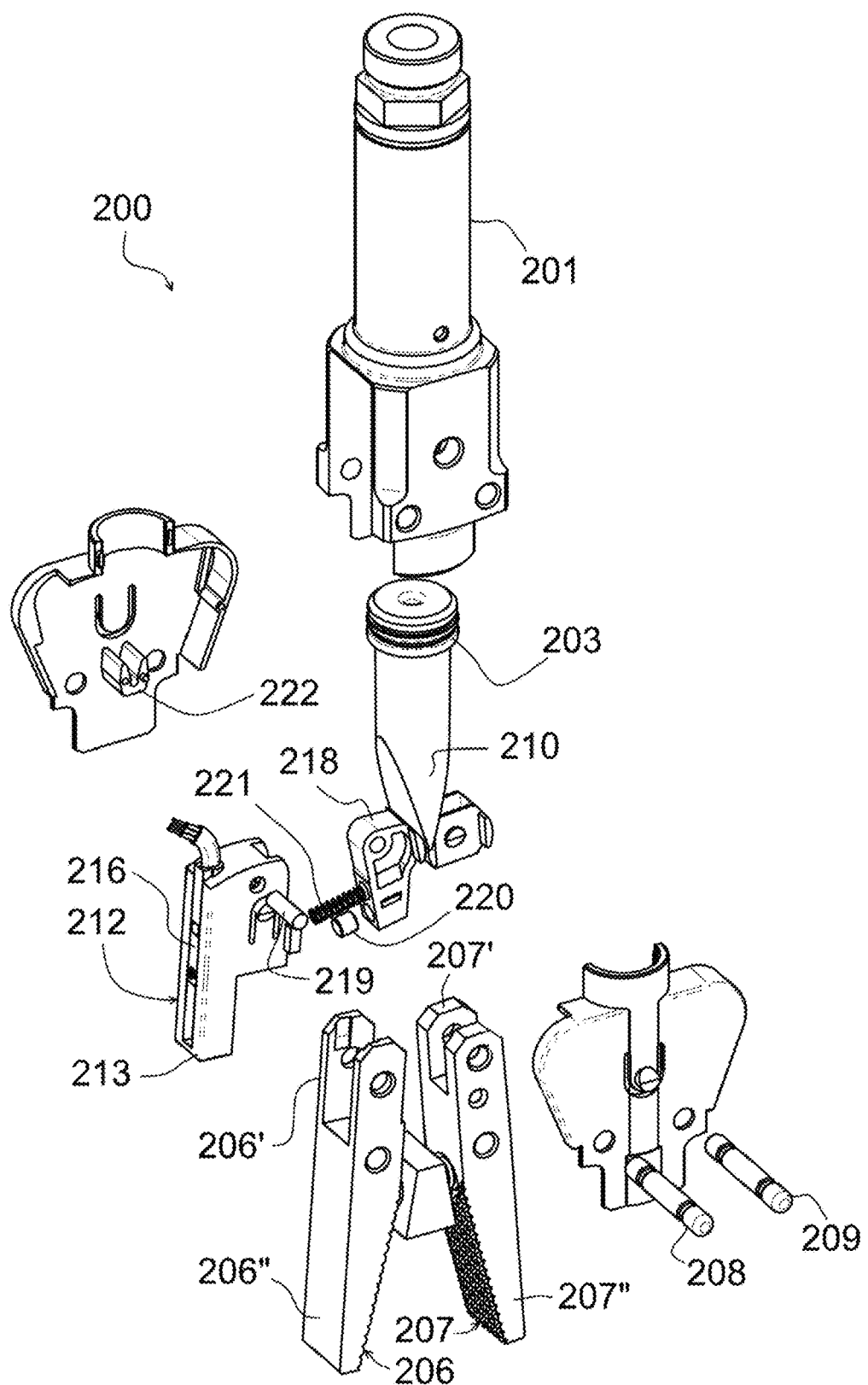
FIG. 9 is a perspective and exploded view of the gripper shown in FIG. 6, whose jaws are open.

The sensor 212 comprises a first portion 213 that can be fixed to the shoulder 206' of the jaw 206, and a second portion 218 hinged to the first portion 213 by means of a pin 219. An elastic element 221, preferably a spring, is interposed between the two portions 213 and 218 of the sensor 212. A magnetic element 220, that can be seen in FIG. 9, is inserted in the second portion 218 of the sensor; an electronic circuit 216 detecting the magnetic element 220 is fitted to the first portion 213 of the sensor 212.

The second portion 218 has a rounded portion intended to interact with the wedge-shaped portion 210 of the piston 203, like a sliding block. The reciprocating movement of the piston 203 limits the rotation of the second portion 218 of the sensor 212 with respect to the first portion 213.

Figure 7:
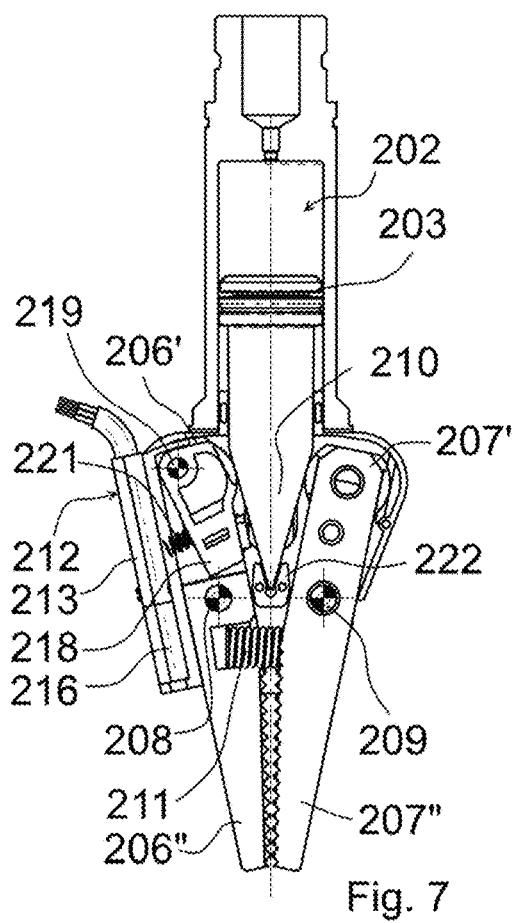
FIG. 7 is a partially sectional and elevation view of the gripper shown in FIG. 6, whose jaws are completely closed.

When the jaws 206, 207 are in the closed position shown in FIG. 7, the wedge-shaped portion 210 of the piston 203 stops against the limit stop 222. On the other hand, in the gripping position of the piece P shown in FIG. 8, the wedge-shaped portion 210 of the piston 203 does not touch the limit stop 222.

Figure 6:
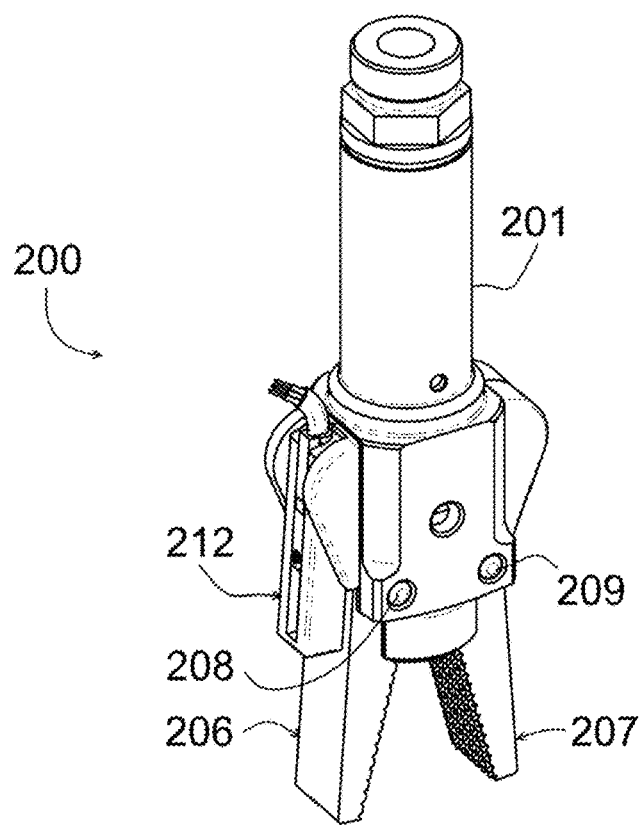
FIG. 6 is a perspective view of a second embodiment of a gripper for industrial manipulators according to the present invention.
Figure 8:
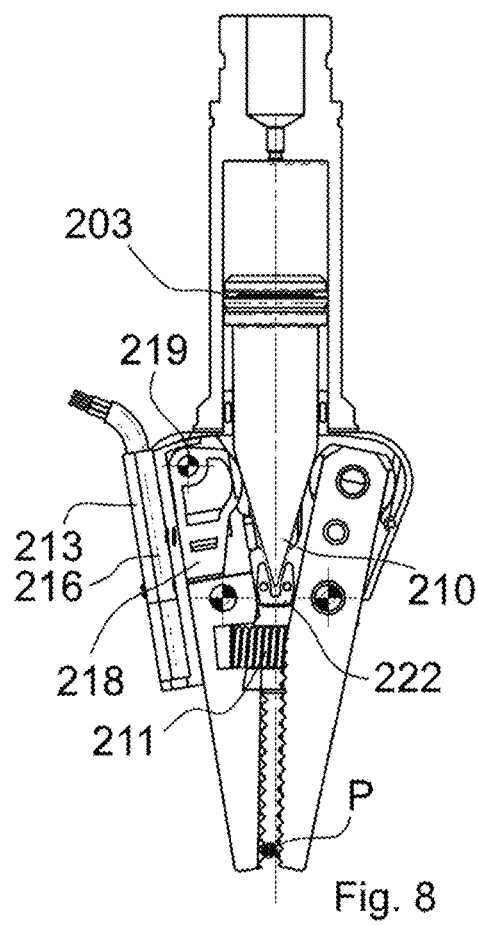
FIG. 8 is a partially sectional and elevation view of the gripper shown in FIG. 6, whose jaws are closed against a piece to be handled.

In FIG. 6 the gripper 200 is shown with the jaws 206 and 207 open due to the thrust exerted by the spring 211. In FIG. 7 the gripper 200 is shown with the jaws 206 and 207 closed due to the thrust exerted by the piston 203. In FIG. 8, the gripper 200 is shown with the jaws 206 and 207 in the gripping position of the piece P, i.e. with a piece P held by the distal ends 206" and 207".

The operation of the gripper 200 is similar to the operation of the gripper 100 described above.

Figure 10:
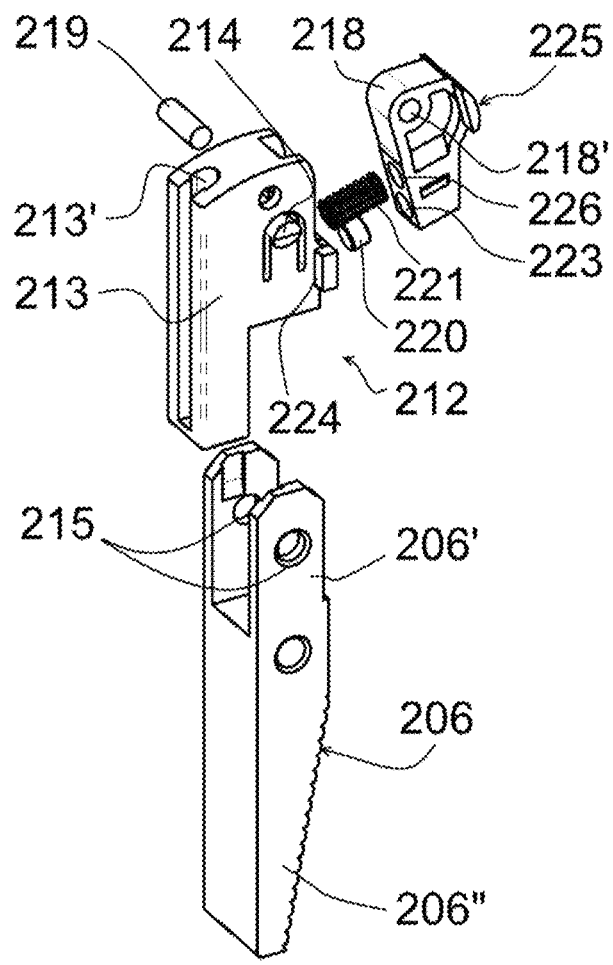
FIG. 10 is a perspective view of a detail of the gripper shown in FIG. 6.

FIG. 10 is a perspective and exploded view of the jaw 206 and the sensor 212 of the gripper 200. As can be seen, the first portion 213 of the sensor 212 is provided with a slot 213' in which the electronic circuit 216 (not shown for simplicity in FIG. 10) is slidingly inserted, with the final position of the electronic circuit 216 that can be adjusted and locked. The first portion 213 is perforated to allow the insertion of the pin 219 along an axis parallel to the pins 208 and 209. The shoulder 206' of the jaw 206 is shaped like a fork and is also perforated with opposing holes 215, and elastic protrusions 214 provided on the sides of the first portion 213 of the sensor 212 snap into these holes. A hole 218' is obtained through the second portion 218 of the sensor 212, to house the pin 219 and allow the hinge coupling with the first portion 213 to be achieved. Two seats 226 and 223 to house the spring 221 and the magnetic element 220, respectively, are provided on the second portion 218. Suitable countercheck surfaces 224 prevent the first portion 213 from rotating with respect to the shoulder 206' of the jaw 206 when the sensor 212 is correctly fitted thereto. The reference numeral 225 denotes the rounded portion of the sensor 212, and in particular of the second portion 218 intended to move on the wedge-shaped portion 210 of the piston 213, like a sliding block, so that the second portion 218 is allowed to relatively rotate with respect to the first portion 213 in response to the stresses exerted by the jaw 206 when the piece P is gripped.

The space between the jaws 206, 207 remains completely free also in this second embodiment 200: the sensor 212 is not fitted to a distal end 206" or 207" of the jaws 206, 207, i.e. it is not fitted to the part of the jaws 206, 207 that must interact with the piece P to be handled.

The sensor 212 can also be made with cheap components, because the low hysteresis type is not required. The spring modulus 221 is selected so that the spring 221 can only be pressed if the gripper 200 grips the piece P; if the piece P is not picked up by the gripper 200, due to an error, the spring 221 is not compressed and this circumstance is distinguished by the sensor 212.

FIGS. 11-15 show a third embodiment 300 of the gripper. It is a pneumatic gripper 300, i.e. whose actuator is a piston 303 that moves inside a cylinder 302 defined in the body 301 of the gripper 300, along a direction defined longitudinal. Unlike the grippers 100 and 200 described above, in the gripper 300 the jaws 306 and 307 do not rotate but translate closer to and away from each other. In other words, the grippers 100 and 200 are angular grippers, and the gripper 300 is a gripper with parallel jaws 306, 307.

The jaws 306, 307 can slide on a dedicated guide 301' fixed with the body 301 of the gripper 300. The guide 301' is oriented orthogonally to the longitudinal direction of displacement of the piston 303: the displacement of the piston 303 to the respective closure dead point causes the jaws 306, 307 to move closer to each other and vice versa, the movement of the piston 303 away from the closure dead point causes the jaws 306, 307 to move away from each other, due to the force exerted by the elastic element 311.

The jaws 306, 307 are moved on the guide 301' by respective swinging arms 330, 331 pivoted to the body 301 of the gripper 300 at the pins 308 and 309. In particular, the swinging arms 330 and 331 each comprise a lobed portion 332, 333 which fits into the corresponding jaw 306, 307 to exert the thrusts in the two translation directions.

In this embodiment 300 the distal ends 306", 307" of the jaws 306, 307 are identified in the sliding blocks on the guide 301' shown in the figures, and the proximal ends 306"', 307"' are identified in the swinging arms 330 and 331, which for the purposes of the present invention can be considered as parts of the jaws 306, 307 even if they are not made in one piece with them.

Figure 11:
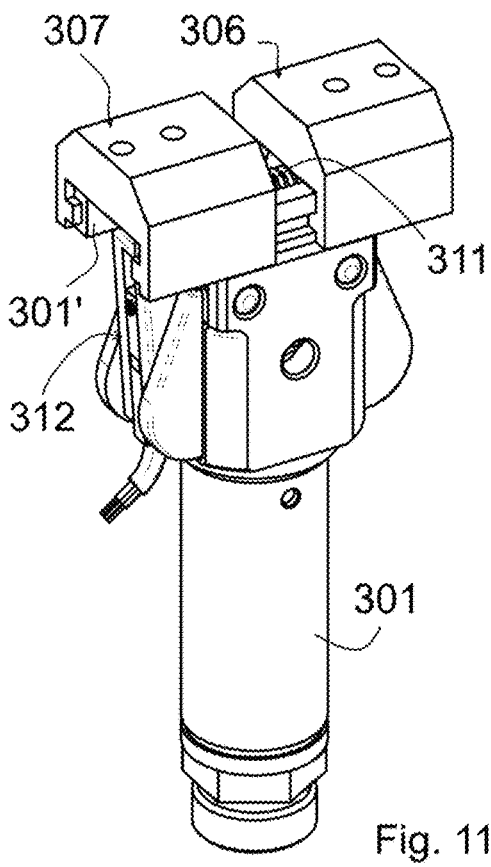
FIG. 11 is a perspective view of a third embodiment of a gripper for industrial manipulators according to the present invention.
Figure 12:
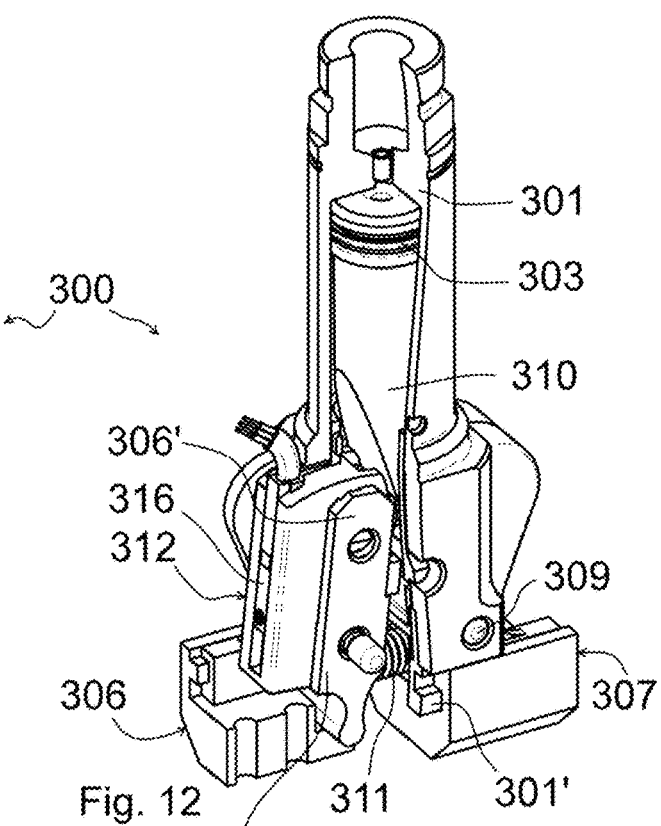
FIG. 12 is an elevation, perspective and partially phantom view of the gripper shown in FIG. 11, whose jaws are open.
Figure 13:
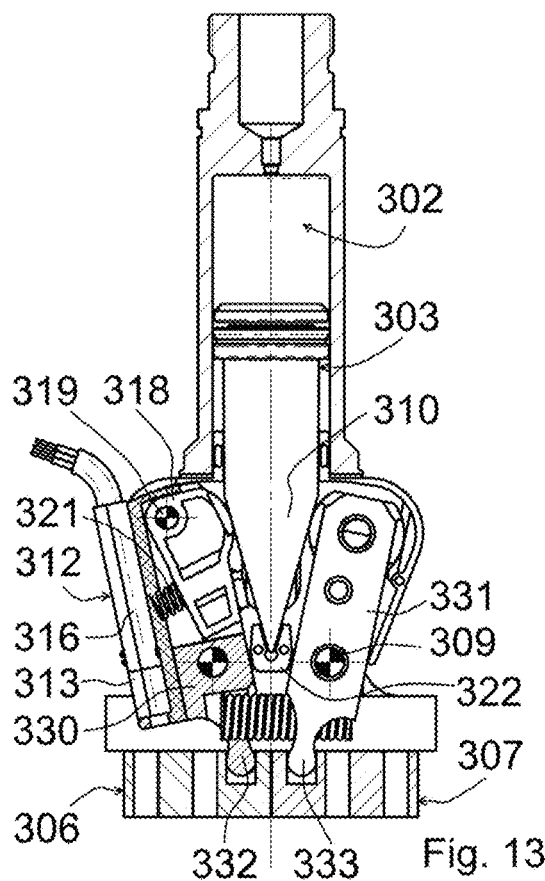
FIG. 13 is a partially sectional and elevation view of the gripper shown in FIG. 11, whose jaws are completely closed.
Figure 14:
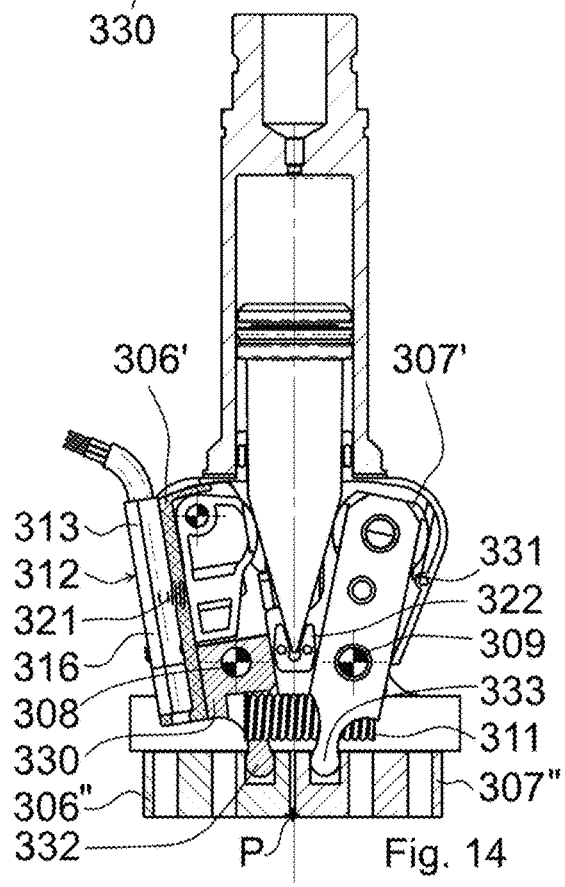
FIG. 14 is a partially sectional and elevation view of the gripper shown in FIG. 11, whose jaws are closed against a piece to be handled.
Figure 15:
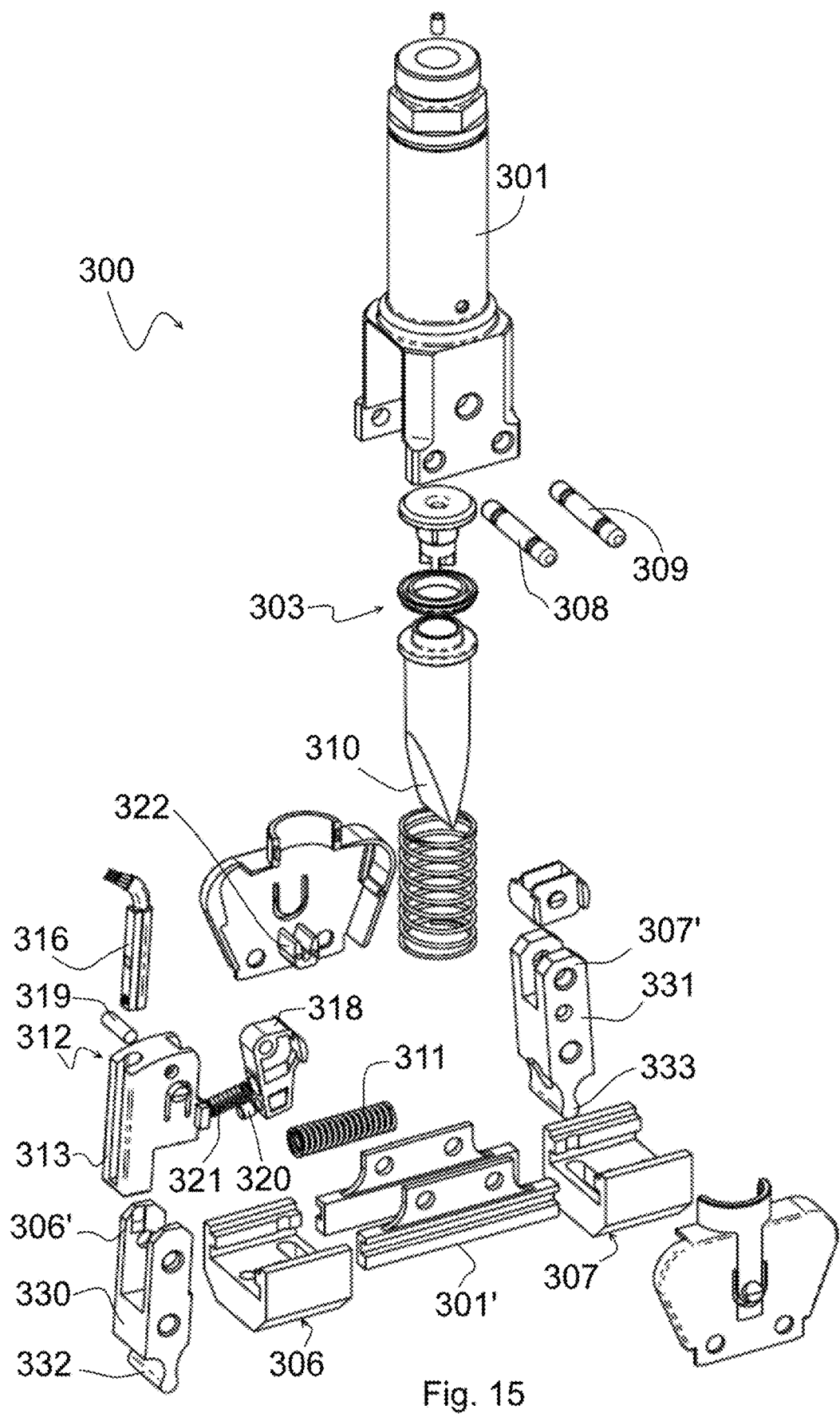
FIG. 15 is a perspective and exploded view of the gripper shown in FIG. 11.

FIG. 11 shows the gripper 300 in elevation and perspective, with the jaws 306, 307 open. The figure shows the spring 311 countering the piston 303 and the guide 301' as well as the sensor 312 functionally interposed between the piston 303 and the proximal end 306"' of the jaw 306. FIG. 12 shows the gripper 300 in elevation and perspective, and partially in phantom view; the piston 303 is in the respective opening dead point (opposite the closure dead point) and therefore it does not exert a thrust on the swinging arms 330, 331 with its wedge-shaped portion 310, so that the spring 311 keeps the oscillating arms 330, 331 spread out, and therefore keeps the jaws 306, 307 open. FIG. 13 is an elevation and (longitudinal) sectional view of the gripper 300 in the configuration with the jaws 306, 307 completely closed; the piston 303 is in the respective closure dead point, in abutment against the limit stop 322, and its wedge-shaped portion 310 is inserted between the swinging arms 330, 331 so as to spread them out in the area between the same piston 303 and the pins 308, 309. In this configuration the lobed portions 332, 333 of the swinging arms 330, 331 are at the minimum distance from each other. FIG. 14 is an elevation and sectional (longitudinal) view of the gripper 300 in the configuration with the jaws 306, 307 in the gripping position of the piece P, i.e. in abutment against a piece P to be handled, from opposite parts with respect to the latter.

Considering that the first portion 313 of the sensor 312 is fixed to the swinging arm 330, which also defines the proximal end 306' of the jaw 306, the operation of the gripper 300 is as follows. When the piston moves towards the respective closure dead point, it counters the second portion 318 of the sensor 312 thus limiting the rotation thereof on the pin 319 with respect to the first portion 313, which remains stationary with respect to the swinging arm 330. The electronic circuit 316 inserted in the first portion 313 and fixed thereto generates an electrical signal indicating the position of the magnetic element 320 with respect to the electronic circuit 316 itself. The spring 321 acts to return the second portion 318 to its initial position when the gripper 300 is deactivated, i.e. when compressed air is no longer supplied to the piston 303. Similarly, the spring 311 reopens the jaws 306, 307 when the piston 303 returns to the opening dead point.

As already noted for the grippers 100 and 200, also in the gripper 300 the spring 321 between the two portions 313, 318 of the sensor 312 contributes to make the system effective. In fact by comparing FIGS. 13 and 14 it is possible to deduce that in the condition of closed jaws 306, 307 the spring 321 is not compressed or is only slightly compressed, while in the condition where the jaws 306, 307 are gripping the piece P, the spring 321 is compressed. As explained above, the spring 321 cooperates with the electronic circuit 316 and the magnetic element 320 to allow the sensor 312 to detect without error the case where the piece P is not present between the jaws 306, 307. In fact, thanks to the described configuration, the spring 321 is compressed only in the case shown in FIG. 14 where the jaws 306, 307 actually take the piece P, otherwise the spring 321 remains uncompressed or only partially compressed. The reason is that the jaw 306 is rotated with respect to the closed position when a piece P is held. As a result, by appropriately selecting the spring modulus 321, for example by carrying out tests, the sensor 312 can be manufactured without using low-hysteresis components.

Also, the gripper 300 is self-centering, like the grippers 100 and 200 described above. FIG. 14 shows that the piece P is held along the longitudinal axis of the gripper 300.

FIGS. 16-20 show a fourth embodiment 400 of the gripper. It is an angular gripper with pneumatic actuator 440 orthogonal to the longitudinal axis along which the piece P is kept. In particular, FIGS. 16-18 show the gripper 400 in elevation and longitudinal section, with the jaws 406, 407 open, closed, and gripping the piece P, respectively. FIG. 19 shows gripper 400 in elevation and perspective, with the jaws 406, 407 open. FIG. 20 is an exploded view of the gripper 400.

In more detail, the jaws 406, 407 are fitted to the body 401 of the gripper 400 so as to be pivotable of the pins 408, 409, i.e. they can swing. Compressed air is supplied into the body 401 via the nozzle 405. Inside the body 401 there is a volume 440 connected to the nozzle 405 and partitioned in two opposing chambers 441 and 442 that are arranged on opposite sides with respect to the nozzle 405 and in which respective air pistons 403' and 403" are movable. The compressed air injected through the nozzle 405 causes the pistons 403' and 403" to move away from each other in the respective chambers 441 and 442; the pistons 403' and 403" can slide in the respective chambers 441 and 442 and are constrained to each other by a telescopic coupling. In particular, the piston 403" has a shaft partially inserted in the piston 403' in a sliding way.

The piston 403' acts on the shoulder 406' of the jaw 406, and the piston 403' acts on the shoulder 407' of the jaw 407, so that when the gripper is activated by supplying compressed air, the pistons 403', 403" move away from each other and spread out the shoulders 406', 407' of the jaws 406, 407, causing them to rotate on the pins 408, 409 and causing the distal ends 406" and 407" of the same jaws 406, 407 to move closer to each other. As mentioned above, the pistons 403', 403" move along a direction orthogonal to the longitudinal axis of the gripper 400.

When the gripper 400 is deactivated, an elastic element 411, practically a spring, returns the jaws 406, 407 to the open position shown in FIGS. 16 and 19. The spring 411 is housed in a special seat in the body 401 of the gripper 400, oriented parallel to the movement direction of the pistons 403', 403", but obviously arranged opposite them with respect to the pins 408, 409.

The gripper 400 is equipped with a sensor 412 fitted on board the jaw 407, and in particular arranged on the shoulder 407'. In FIG. 20 the sensor 41 has been omitted for simplicity, but is clearly visible in FIGS. 16-19.

The sensor 412 comprises a first portion 413 made in one piece with the shoulder 407' of the jaw 407, in which there is an electronic circuit 416 equipped with a LED light indicator 450. The magnetic element 420 of the sensor 412 is housed on board the piston 403", in a corresponding seat, and a spring 421 is functionally interposed between the piston 403" and the shoulder 407" of the jaw 407. The spring 421 is held on the piston 403" by the shoulder 407' of the jaw 407, which prevents the spring 421 from accidentally coming out.

The operation of the sensor 412 is as follows. In the initial condition of inactive gripper 400, shown in FIG. 16 with the jaws 406, 407 open, the spring 421 is not compressed, or is only slightly compressed, and the magnetic element 420 is at a first distance from the electronic circuit 416. When the gripper 400 is activated, i.e. compressed air is supplied thereto, the pistons 403' and 403" forces the jaws 406, 407 to the closed position shown in FIG. 17: since the pistons 403' and 403" reach a limit stop on the elastic rings 436 and 437, the movement of the pistons 403', 403" away from each other does not cause the spring 421 to be compressed.

In other words, the elastic rings 436 and 437 stop the pistons 403' and 403", preventing the magnetic element 420 from stressing the electronic circuit 416 if the gripper 400 closes uselessly, i.e. if the piece P is not picked up and held between the jaws 406, 407.

When the gripper 400 picks up a piece P, as shown in FIG. 18, the compression of the spring 421 compensates for the size of the piece P: in this position the shoulder 407' of the gripper 407" is closer to the piston 403" with respect to the position shown in FIG. 17 and, therefore, the magnetic element 420 is closer to the electronic circuit 416, the latter detecting the former and turning on the LED 450 to confirm that the piece P has been gripped. The components are caused to return to the initial position of FIG. 16 by the deactivation of the gripper 400.

Therefore, even in the gripper 400 the spring 421 of the sensor 412 is compressed only when the piece P is picked up, while in all other positions of the jaws 406, 407 there is no substantial compression of the spring 421. The spring 421 cooperates with the electronic circuit 416 and the magnetic element 420 to distinguish in effective, error-free and simple way, the gripping condition of the piece P.

Even in the gripper 400 the space around the jaws 406, 407 remains fully usable since it is not encumbered by the sensor 412. Even for the clamp 400, the sensor 412 does not need to be expensive.

Based on the provided examples, it can be considered the following method for detecting the presence of a piece between the jaws of an industrial manipulator gripper. The method is based on the fact that between the distal ends of the jaws there is not a magnetic sensor 112, 212, 312, 412, as provided in traditional solutions, but there is precisely the piece P to be handled, even if in a different position, functionally interposed between the actuator of the gripper and the proximal ends, or shoulders, of the jaws.

The sensor 112, 212, 312, 412 is made with a magnetic element 120, 220, 320, 420 movable with respect to a corresponding electronic detecting circuit 116, 216, 316, 416 univocally depending on the relative position of the jaws 106-107, 206-207, 306-307, 406-407, and with an elastic element 121, 221, 321, 421 that counteracts the approach of the magnetic element 120, 220, 320, 420 with respect to the electronic circuit 116, 216, 316, 416. By correctly selecting the elastic element, i.e. selecting the correct force it exerts, the gripper is configured so that the elastic element 121, 221, 321, 421 is subject to compression only when the gripper 100, 200, 300, 400 actually holds a piece P.

This method has two main advantages:
with respect to the traditional solution in which the magnetic element is positioned on the piston and therefore the sensor must be of the analogical or low hysteresis type, the method according to the present invention can also be implemented with cheaper digital ON-OFF sensors, because the elastic element 121, 221, 321, 421 guarantees the correct operation, i.e. it guarantees that the sensor 112, 212, 312, 412 generates a gripping signal of the piece P only when the piece P is actually between the jaws 106-107, 206-207, 306-307, 406-407 of the gripper;

compared to the traditional solution in which the magnetic element is positioned on a gripper jaw, the method according to the present invention can be implemented by positioning the sensor 112, 212, 312, 412 in contact with the actuator, in a less bulky position.

FIGS. 1-20 show examples of grippers 100, 200, 300, 400 with two jaws, but in general the present invention is also applicable to grippers with only one jaw, or with more than one jaw, for example grippers with three radial jaws.

FIGS. 1-20 show examples of grippers 100, 200, 300, 400 with pneumatic actuator, but in general the present invention is also applicable to grippers with hydraulic or electric actuator.

FIGS. 21-25 show a fifth embodiment 500 of the gripper according to the present invention, for which the applicant reserves to file a divisional patent application. It is also in this case an angular gripper 500, in which two jaws 506 and 507 swing on respective pins 508, 509 with respect to the body 501, in response to the stresses exerted by an air piston 503 which operates as an actuator and moves, alternately in the longitudinal direction, inside a cylinder 502 obtained in the body 501.

An elastic element 511, basically a preloaded spring, is interposed between the two jaws 506, 507, on the opposite side of the piston 503 with respect to the pins 508, 509, to bring the jaws 506, 507 to the open position when the piston 503 moves back in the cylinder 502. In other words, the spring 511 exerts a thrust on the distal ends 506" and 507" of the jaws 506, 507 to spread them out, and the piston 503 exerts a thrust on the shoulders 506' and 507' of the jaws 506, 507', by means of a wedge-shaped portion 510 that slips right between the shoulders 506' and 507' to spread them out, countering the force exerted by the spring 511.

The gripper 500 comprises a pneumatic-type sensor 512. The sensor 512 comprises in turn a first portion 513 that can be fixed to the shoulder 506' of the jaw 506, and a second portion 518 hinged to the first portion 513 by means of a pin 519. An elastic element 521, preferably a spring, is interposed between the two portions 513 and 518 of the sensor 512.

A duct 513' is defined in the first portion 513 and can be connected by means of a nozzle to an outer vacuum source, e.g. an extractor, or a vacuum pump, so that a depression, or vacuum, can be created in the duct 513'.

A shutter 520, preferably spherical as shown in figures, for example made of rubber, is inserted in the second portion 518 of the sensor 512; unlike the solutions described above, which are equipped with an electronic circuit for detecting a magnetic element, in the pneumatic sensor 512 the detection of a magnetic element by Hall effect is not provided, being instead provided the detection of the pressure value (of depression in particular) in the duct 513, as will be described later on.

The second portion 518 has a rounded portion intended to interact with the wedge-shaped portion 510 of the piston 503, like a sliding block. The reciprocating movement of the piston 503 causes the second portion 518 of the sensor 512 to rotate with respect to the first portion 513 and, therefore, causes the shutter 520 to be displaced with respect to the first portion 513 and, therefore, with respect to the duct 513'.

Figure 23:
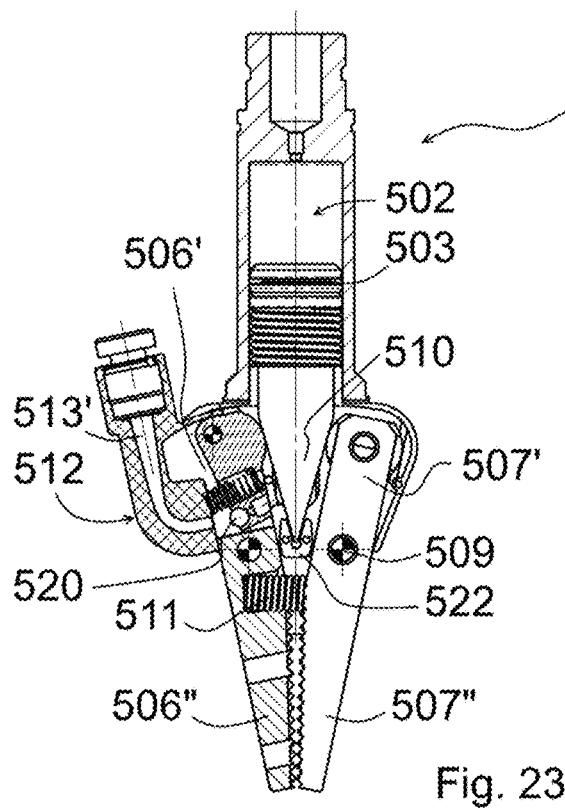
FIG. 23 is a partially sectional and elevation view of the gripper shown in FIG. 21, whose jaws are completely closed.

When the jaws 506, 507 are in the closed position shown in FIG. 23, the wedge-shaped portion 510 of the piston 503 stops against the limit stop 522. On the other hand, in the gripping position of the piece P shown in FIG. 24, the wedge-shaped portion 510 of the piston 503 does not touch the limit stop 522.

Figure 21:
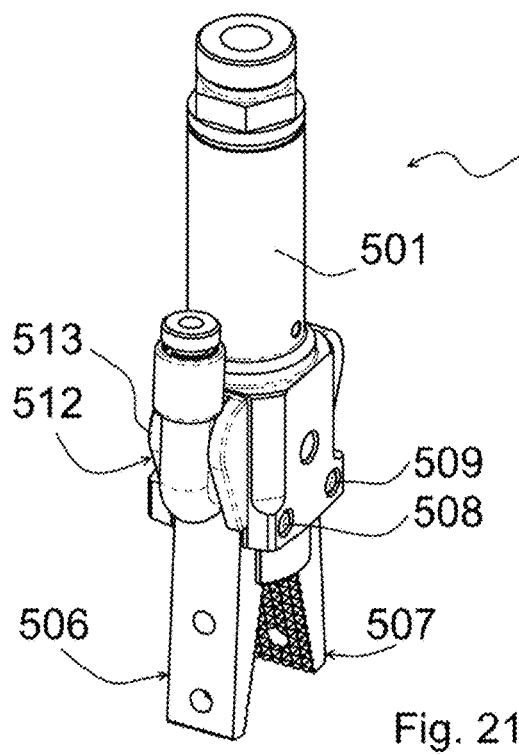
FIG. 21 is a perspective view of a fifth embodiment of a gripper for industrial manipulators according to the present invention.
Figure 22:
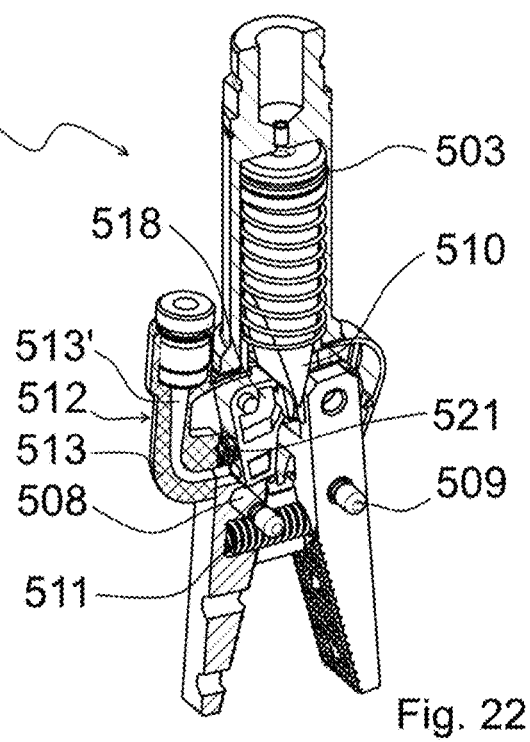
FIG. 22 is an elevation, perspective and partially phantom view of the gripper shown in FIG. 21, whose jaws are open.
Figure 24:
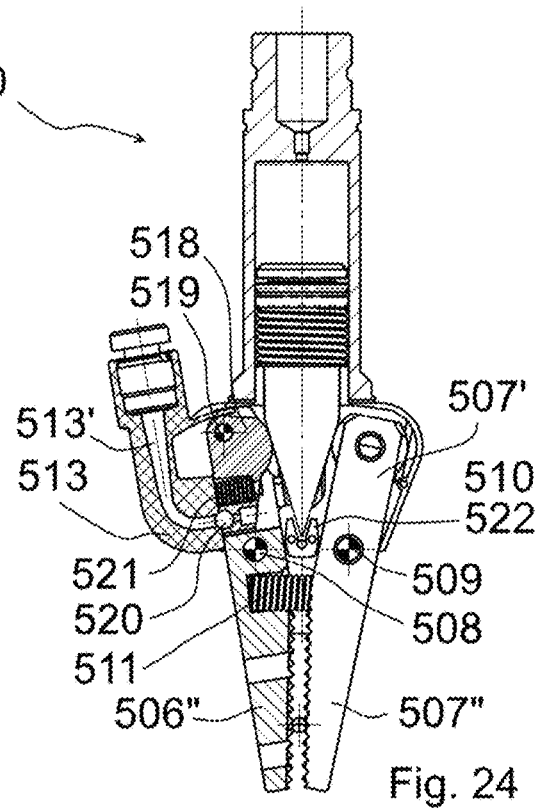
FIG. 24 is a partially sectional and elevation view of the gripper shown in FIG. 21, whose jaws are closed against a piece to be handled.

In FIGS. 21 and 22 the gripper 500 is shown with the jaws 506 and 507 open due to the thrust exerted by the spring 511. In FIG. 23 the gripper 500 is shown with the jaws 506 and 507 closed due to the thrust exerted by the piston 503. In FIG. 24, the gripper 500 is shown with the jaws 506 and 507 in the gripping position of the piece P, i.e. with a piece P held by the distal ends 506" and 507".

Figure 25:
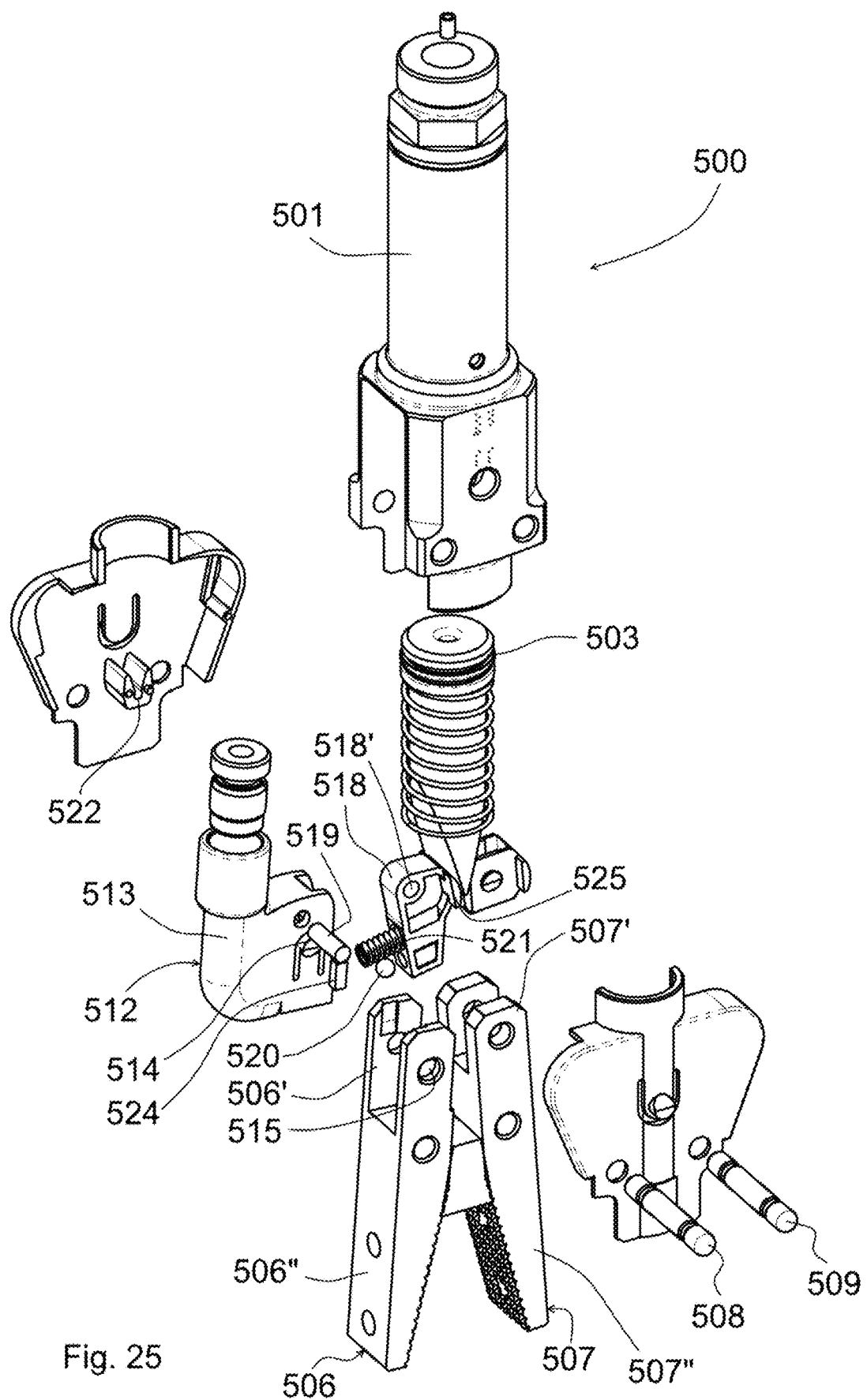
FIG. 25 is a perspective and exploded view of the gripper shown in FIG. 21.

FIG. 25 is an exploded perspective view of the gripper 500. As can be seen, the first portion 513 is perforated to allow the pin 519 to be inserted along an axis parallel to the pins 508 and 529. The proximal portion, or shoulder 506' of the jaw 506, is shaped like a fork and is also perforated with opposing holes 515, and elastic protrusions 514 provided on the sides of the first portion 513 of the sensor 512 snap into these holes. A hole 518' is obtained through the second portion 518 of the sensor 512, to house the pin 519 and allow the hinge coupling with the first portion 513 to be achieved. Two seats, to house the spring 521 and the shutter 220, respectively, are provided on the second portion 518. Suitable countercheck surfaces 524 prevent the first portion 513 from rotating with respect to the shoulder 506' of the jaw 506 when the sensor 512 is correctly fitted thereto. The reference numeral 525 denotes the rounded portion of the sensor 512, and in particular of the second portion 518 intended to move on the wedge-shaped portion 510 of the piston 513, like a sliding block, so that the second portion 518 is rotated relatively with respect to the first portion 513.

Referring in particular to FIGS. 23 and 24, when the gripper 500 is activated, i.e. when the piston 503 forces the jaws 506, 507 to close, two circumstances may occur:

in a first case the gripper 500 does not pick up the piece P, as in FIG. 23. An angle is defined between the first portion 513 and the second portion 518 of the sensor 512 and the shutter 520 does not close the duct 513'. A special outer instrument designed to detect the depression in the duct 513' detects a first value, for example corresponding to −0.3 bar;

in a second case, the gripper picks up and holds a piece P between the jaws 506 and 507. The second portion 518 of the sensor 512 is in abutment against the first portion 513, due to the thrust exerted by the jaw 506, and the shutter 520 closes the duct 513'. The outer instrument detects a second depression value in the duct 513', for example corresponding to −0.8 bar.

Therefore, the operation of the sensor 512 is simple and based on the detection of the pressure (depression) value in the duct 513': the variation of the measured value distinguishes the case in which the gripper 500 has correctly picked up a piece P from the case in which the gripper 500 has been activated uselessly, without picking up the piece P.

The space around the jaws 506, 507 remains completely free even in this fifth embodiment 500: the sensor 512 is not fitted to a distal end 506" or 507" of the jaws 506, 507, i.e. it is not fitted to the part of the jaws 506, 507 that must interact with the piece P to be handled.

The sensor 512 can also be made with cheap components easily available on the market and, in addition, has the advantage that the reading of the pressure value in the duct 513' can be done by outside means connected to the sensor 512, even remotely positioned and very accurate, that are not susceptible to displacements and stresses precisely because not fitted on board the gripper 500.

The invention claimed is:

1. A gripper (100, 200, 300, 400, 500) for industrial manipulators, comprising a body (101,201,301,401,501), jaws (106-107; 206-207; 306-307; 406-407; 506-507) constrained to the body (101, 201, 301, 401, 501) and activable to hold and release a piece (P), an actuator (103, 203, 303, 440, 503) of the jaws (106-107; 206-207; 306-307; 406-407; 506-507) and a sensor (112, 212, 312, 412, 512) configured to detect the presence of a piece (P) between said jaws (106-107; 206-207; 306-307; 406-407; 506-507), characterized in that the sensor (112, 212, 312, 412, 512) is functionally interposed between the actuator (103, 203, 303, 440, 503) and one of said jaws (106-107; 206-207; 306-307; 406-407; 506-507), wherein the sensor (112, 212, 312, 412) in turn comprises a magnetic element (120, 220, 320, 420) and an electronic circuit (116, 216, 316, 416) for detecting the magnetic element (120, 220, 320, 420), and wherein the electronic circuit (116, 216, 316, 416) is fixed with a jaw (106; 206; 306; 406) and the magnetic element (120, 220, 320, 420) is movable with respect to the electronic circuit (116, 216, 316, 416) in response to the stresses exerted by said one jaw (106; 206; 306; 406).

2. A Gripper (100, 200, 300, 400, 500) according to claim 1, wherein the jaws comprise distal ends (106"-107"-206"-207"-306"-307"-406"-407" 506"-507") intended to hold a piece (P) and opposite proximal ends, or shoulders, (106'-107'; 206'-207'; 306'-307'; 406'-407'; 506'-507') movable by said actuator (103, 203, 303, 440, 503) with respect to one another, and wherein the sensor (112, 212, 312, 412, 512) is functionally interposed between the actuator (103, 203, 303, 440, 503) and the proximal end (106'; 206'; 306'; 406', 506') of one of said jaws (106-107; 206-207; 306-307; 406-407; 506-507).

3. A Gripper (100, 200, 300, 400) according to claim 1, wherein the electronic circuit (116, 216, 316, 416) is fitted to a jaw (106; 206; 306; 406) at a respective proximal end (106'; 206'; 306'; 406'), and wherein the magnetic element (120, 220, 320, 420) is fitted to:

the actuator (440), and can move therewith with respect to the electronic circuit (416) between a first position, at which the magnetic element (420) is at the maximum distance from the electronic circuit (416), and a second position, at which the magnetic element (420) is at the minimum distance from the electronic circuit (416), Or an element (118, 218, 318, 418) interposed between the electronic circuit (116, 216, 316, 416) and the actuator (103, 203, 303) and movable between a first position, at which the magnetic element (120, 220, 320, 420) is at the maximum distance from the electronic circuit (116, 216, 316, 416), and a second position, at which the magnetic element (120, 220, 320, 420) is at the minimum distance from the electronic circuit (116, 216, 316, 416), in response to the stresses exerted by said one jaw (106; 206; 306; 406).

4. A Gripper (100, 200, 300, 400) according to claim 3, wherein the position of minimum distance of the magnetic element (120, 220, 320, 420) from the electronic circuit (116, 216, 316, 416) corresponds to the jaws (106-107; 206-207; 306-307; 406-407) gripping a piece (P), i.e. corresponds to the state in which a piece (P) is held between the jaws (106-107; 206-207; 306-307; 406-407).

5. Gripper (100, 200, 300, 400) according to claim 1, wherein the sensor (112, 212, 312) comprises a first portion (113, 213, 313) which defines a housing of an electronic circuit (116, 216, 316) for detecting a magnetic element (120, 220, 320), and a second portion (118, 218, 318) in which the magnetic element (120, 220, 320) is housed, and comprising an elastic element (121,221, 321) interposed between the first portion (113,213, 313, 413) and the second portion (118, 218, 318), and wherein the second portion (118, 218, 318) is movable with respect to the first portion (113, 213, 313, 413), in response to the stresses exerted by a jaw (106; 206; 306; 406), and wherein the elastic element (121, 221, 321) exerts a countering force.

6. A Gripper (100, 200, 300, 400) according to claim 5, wherein the first portion (113, 213, 313) is fixed with a jaw (106; 206; 306; 406) or is made in one piece therewith, and the second portion (118, 218, 318) is hinged to the first portion (113, 213, 313) and can be rotated with respect to the latter as a result of the stresses exerted by said one jaw (106; 206; 306; 406) and as a result of the countering force exerted by the elastic element (121; 221; 321).

7. A Gripper (100, 200, 300, 400) according to claim 6, wherein the first portion (113, 213, 313) is fixed to a jaw (106; 206; 306) at a respective proximal end (106; 206; 306') and said one jaw (106; 206; 306; 406) forces the second portion (118,218,318) to rotate with respect to the first portion (113,213,313), and wherein, when a piece (P) is held between the jaws (106-107; 206-207; 306-307), the angle between the first portion (113, 213, 313) and the second portion (118, 218, 318) is minimum, and the elastic element (121, 221, 321) is compressed.

8. Gripper (100, 200, 300, 400) according to claim 5, wherein the second portion (118, 218, 318) of the sensor (112, 212, 312) is a sliding block in abutment against a portion (110, 210, 310) of the actuator (103, 203, 303).

9. Gripper (100, 200, 300, 400) according to claim 1, wherein the position of the magnetic element (120, 220, 320, 420) with respect to the respective electronic detecting circuit (116, 216, 316, 416) depends both on the position of at least one jaw (106; 206; 306; 406) and on the possible presence of a piece (P) held between the jaws (106-107; 206-207; 306-307).

10. Gripper (100, 200, 300, 400) according to claim 1, wherein the magnetic element (120, 220, 320, 420) is constrained to a corresponding jaw (106; 206; 306; 406) and is susceptible to be displaced with respect to the latter, and wherein:
the magnetic element (120, 220, 320, 420) moves fixedly with the corresponding jaw (106; 206; 306; 406) during the closing movement of the jaws (106-107; 206-207; 306-307; 406-407) up to the point in which the jaws (106-107; 206-207; 306-307; 406-407) are closed against a piece (P);
the magnetic element (120, 220, 320, 420) is rotatable with respect to the corresponding jaw (106; 206; 306; 406), in response to the stresses exerted by the actuator (103, 203, 303, 440), as long as a piece (P) is clamped between the jaws (106-107; 206-207; 306-307; 406-407).

11. Gripper (100, 200, 300, 400) according to claim 1, wherein the actuator (103, 203, 303, 440) comprises at least one air piston (103, 203, 303, 403', 403") alternately movable along a longitudinal direction in a corresponding cylinder (102, 202, 302, 402) defined in a gripper body (101, 201, 301, 401), under the action of a pressurized fluid supplied into the cylinder (102,202,302,402) and of an elastic return element (111, 211, 311, 411).

12. Gripper (100, 200, 400) according to claim 1, wherein the actuator is one of a pneumatic actuator, a hydraulic actuator, or and an electric actuator.

13. Gripper (100, 200, 400) according to claim 1, wherein the jaws (106-107; 206-207; 406-407) can pivot on pins (108-109; 208-209; 408-409) and each comprise a distal end (106"-107"; 206"-207"; 406"-407") intended to hold a piece (P), and a proximal end, or shoulder, (106'-107'; 206'-207'; 406'-407') on which the actuator (103, 203, 303, 440) exerts a thrust, and wherein the distal ends (106"-107"; 206"-207"; 406"-407") are opposite the proximal ends (106'-107'; 206'-207'; 406'-407') with respect to the pins (108-109; 208-209; 408-409), and the jaws swing between an open position, at which the distal ends (106"-107"; 206"-207"; 406"-407") are spread out and the proximal ends (106'-107'; 206'-207'; 406'-407') are close together, and a closed position, at which the distal ends (106"-107"; 206"-207"; 406"-407") are close together and the proximal ends (106'-107'; 206'-207'; 406'-407') are spread out, and the position of the jaws (106-107; 206-207; 406-407) when gripping the piece (P) is intermediate with respect to the open position and the closed position.

14. Gripper (300) according to claim 1, wherein at least one jaw (306-307) can be translated along a guide (301') and comprises a corresponding arm (330, 331) swinging on a pin (308, 309), which exerts the thrusts to the jaw (306, 307) in both directions along the guide (301'), and wherein the proximal end (306'-307') is defined by said swinging arm (330, 331) and the sensor (312) is functionally interposed between the actuator (303) and said swinging arm (330, 331).

15. Gripper (100, 200, 300, 400) according to claim 1, wherein the actuator (103, 203, 303, 440) comprises at least one air piston (103, 203, 303, 403', 403") that can be inserted or moved between the proximal ends (106'-107'; 206'-207'; 406'-407') of the jaws (106-107; 206-207; 406-407), to spread them out.

16. A method for detecting the presence of a piece (P) between the jaws (106-107; 206-207; 306-307; 406-407; 506-507) of a gripper (100, 200, 300, 400, 500) for industrial manipulators, comprising:
providing a gripper (100, 200, 300, 400, 500) comprising a body (101, 201, 301, 401), jaws (106-107; 206-207; 306-307; 406-407, 506-507) constrained to the body (101, 201, 301, 401, 501) and activable to hold and release a piece (P), an actuator (103,203,303,440,503) of the jaws (106-107; 206-207; 306-307; 406-407; 506-507) and a sensor (112, 212, 312, 412, 512),
by means of the actuator (103, 203, 303, 440, 503), moving the jaws (106-107; 206-207; 306-307; 406-407; 506-507) between an open position, a closed position and a gripping position of the piece (P), to pick up and hold a piece (P),
by means of the sensor (112, 212, 312, 412, 512), generating a signal indicating the position of the jaws (106-107; 206-207; 306-307; 406-407, 506-507),
characterized in that the sensor (112, 212, 312, 412, 512) is functionally interposed between the actuator (103, 203, 303, 440, 503) and one (106, 206, 306, 407, 506) of said jaws (106-107; 206-207; 306-307; 406-407, 506-507) and generates a signal when said one jaw (106, 206, 306, 407, 506) is gripping a piece (P),
wherein the sensor (112, 212, 312, 412) in turn comprises a magnetic element (120, 220, 320, 420) and an electronic circuit (116, 216, 316, 416) for detecting the magnetic element (120, 220, 320, 420), and wherein the electronic circuit (116, 216, 316, 416) is fixed with a jaw (106; 206; 306; 406) and the magnetic element (120, 220, 320, 420) is movable with respect to the electronic circuit (116, 216, 316, 416) in response to the stresses exerted by said one jaw (106; 206; 306; 406).

17. A Method according to claim 16, wherein the sensor (112, 212, 312, 412, 512) detects the deviation of said one jaw (106, 206, 306, 407, 506) from the closed position of the jaws (106-107; 206-207; 306-307; 406-407, 506-507) when the actuator (103, 203, 303, 440, 503) is in the position corresponding to the closed jaws (106-107; 206-207; 306-307; 406-407; 506-507).

18. Method according to claim 16, wherein the sensor (112, 212, 312, 412) comprises a magnetic element (120, 220, 320, 420) constrained to a corresponding jaw (106; 206; 306; 406), and an electronic circuit (116, 216,316, 416) fixed with a jaw (106; 206; 306; 406), for detecting the magnetic element (120, 220, 320, 420), and wherein:
the magnetic element (120, 220, 320, 420) moves fixedly with the corresponding jaw (106; 206; 306; 406) during the closing movement of the jaws (106-107; 206-207; 306-307; 406-407) up to the point in which the jaws (106-107; 206-207; 306-307; 406-407) are closed against a piece (P), and the distance between the magnetic element (120, 220, 320, 420) and the electronic circuit (116, 216, 316, 416) is unchanged, i.e. remains constant;
the magnetic element (120, 220, 320, 420) is rotatable with respect to the corresponding jaw (106; 206; 306; 406), in response to the stresses exerted by the actuator (103, 203, 303, 440), as long as a piece (P) is clamped between the jaws (106-107; 206-207; 306-307; 406-407), and the distance between the magnetic element (120, 220, 320, 420) and the electronic circuit (116, 216, 316,416) is reduced to the minimum.

19. A gripper (100, 200, 300, 400, 500) for industrial manipulators, comprising a body (101,201,301,401,501), jaws (106-107; 206-207; 306-307; 406-407; 506-507) constrained to the body (101, 201, 301, 401, 501) and activable to hold and release a piece (P), an actuator (103, 203, 303, 440, 503) of the jaws (106-107; 206-207; 306-307; 406-407; 506-507) and a sensor (112, 212, 312, 412, 512) configured to detect the presence of a piece (P) between said jaws (106-107; 206-207; 306-307; 406-407; 506-507),
characterized in that the sensor (112, 212, 312, 412, 512) is functionally interposed between the actuator (103, 203, 303, 440, 503) and one of said jaws (106-107; 206-207; 306-307; 406-407; 506-507),
wherein the sensor (112, 212, 312) comprises a first portion (113, 213, 313) which defines a housing of an electronic circuit (116, 216, 316) for detecting a magnetic element (120, 220, 320), and a second portion (118, 218, 318) in which the magnetic element (120, 220, 320) is housed, and comprising an elastic element (121,221, 321) interposed between the first portion (113,213, 313, 413) and the second portion (118, 218, 318), and wherein the second portion (118, 218, 318) is movable with respect to the first portion (113, 213, 313, 413), in response to the stresses exerted by a jaw (106; 206; 306; 406), and wherein the elastic element (121, 221, 321) exerts a countering force.

20. A gripper (100, 200, 300, 400, 500) for industrial manipulators, comprising a body (101,201,301,401,501), jaws (106-107; 206-207; 306-307; 406-407; 506-507) constrained to the body (101, 201, 301, 401, 501) and activable to hold and release a piece (P), an actuator (103, 203, 303, 440, 503) of the jaws (106-107; 206-207; 306-307; 406-407; 506-507) and a sensor (112, 212, 312, 412, 512) configured to detect the presence of a piece (P) between said jaws (106-107; 206-207; 306-307; 406-407; 506-507),
characterized in that the sensor (112, 212, 312, 412, 512) is functionally interposed between the actuator (103, 203, 303, 440, 503) and one of said jaws (106-107; 206-207; 306-307; 406-407; 506-507)
wherein the actuator (103, 203, 303, 440) comprises at least one air piston (103, 203, 303, 403', 403") alternately movable along a longitudinal direction in a corresponding cylinder (102, 202, 302, 402) defined in the gripper body (101, 201, 301, 401), under the action of a pressurized fluid supplied into the cylinder (102, 202,302,402) and of an elastic return element (111, 211, 311, 411).

21. A method for detecting the presence of a piece (P) between the jaws (106-107; 206-207; 306-307; 406-407; 506-507) of a gripper (100, 200, 300, 400, 500) for industrial manipulators, comprising:
providing a gripper (100, 200, 300, 400, 500) comprising a body (101, 201, 301, 401), jaws (106-107; 206-207; 306-307; 406-407, 506-507) constrained to the body (101, 201, 301, 401, 501) and activable to hold and release a piece (P), an actuator (103,203,303,440,503) of the jaws (106-107; 206-207; 306-307; 406-407; 506-507) and a sensor (112, 212, 312, 412, 512),
by means of the actuator (103, 203, 303, 440, 503), moving the jaws (106-107; 206-207; 306-307; 406-407; 506-507) between an open position, a closed position and a gripping position of the piece (P), to pick up and hold a piece (P),
by means of the sensor (112, 212, 312, 412, 512), generating a signal indicating the position of the jaws (106-107; 206-207; 306-307; 406-407, 506-507),
characterized in that the sensor (112, 212, 312, 412, 512) is functionally interposed between the actuator (103, 203, 303, 440, 503) and one (106, 206, 306, 407, 506) of said jaws (106-107; 206-207; 306-307; 406-407, 506-507) and generates a signal when said one jaw (106, 206, 306, 407, 506) is gripping a piece (P),
wherein the sensor (112, 212, 312, 412) comprises a magnetic element (120, 220, 320, 420) constrained to a corresponding jaw (106; 206; 306; 406), and an electronic circuit (116, 216,316, 416) fixed with a jaw (106; 206; 306; 406), for detecting the magnetic element (120, 220, 320, 420), and wherein:
the magnetic element (120, 220, 320, 420) moves fixedly with the corresponding jaw (106; 206; 306; 406) during the closing movement of the jaws (106-107; 206-207; 306-307; 406-407) up to the point in which the jaws (106-107; 206-207; 306-307; 406-407) are closed against a piece (P), and the distance between the magnetic element (120, 220, 320, 420) and the electronic circuit (116, 216, 316, 416) is unchanged, i.e. remains constant;
the magnetic element (120, 220, 320, 420) is rotatable with respect to the corresponding jaw (106; 206; 306; 406), in response to the stresses exerted by the actuator (103, 203, 303, 440), as long as a piece (P) is clamped between the jaws (106-107; 206-207; 306-307; 406-407), and the distance between the magnetic element (120, 220, 320, 420) and the electronic circuit (116, 216, 316,416) is reduced to the minimum.

* * * * *